US012424399B2

(12) United States Patent
Lee et al.

(10) Patent No.: US 12,424,399 B2
(45) Date of Patent: Sep. 23, 2025

(54) AIR CIRCUIT BREAKER

(71) Applicant: LS ELECTRIC CO., LTD., Anyang-si (KR)

(72) Inventors: Kyu Ho Lee, Anyang-si (KR); Yong Ik Park, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 214 days.

(21) Appl. No.: 18/284,773

(22) PCT Filed: Mar. 24, 2022

(86) PCT No.: PCT/KR2022/004102
§ 371 (c)(1),
(2) Date: Sep. 28, 2023

(87) PCT Pub. No.: WO2022/211360
PCT Pub. Date: Oct. 6, 2022

(65) Prior Publication Data

US 2024/0186082 A1 Jun. 6, 2024

(30) Foreign Application Priority Data

Mar. 29, 2021 (KR) ........................ 10-2021-0040461
Jan. 7, 2022 (KR) ........................ 10-2022-0002656

(51) Int. Cl.
*H01H 31/08* (2006.01)
*H01H 31/06* (2006.01)

(52) U.S. Cl.
CPC ............ *H01H 31/08* (2013.01); *H01H 31/06* (2013.01)

(58) Field of Classification Search
CPC ......... H02B 11/00; H02B 11/02; H02B 11/12; H02B 11/127; H02B 11/133;
(Continued)

(56) References Cited

U.S. PATENT DOCUMENTS 9,576,751 B1 * 2/2017 Handshoe .............. H02B 11/00

FOREIGN PATENT DOCUMENTS

EP 2884606 B1 12/2018
JP 5115688 B2 1/2013
(Continued)

OTHER PUBLICATIONS

International Search Report for related International Application No. PCT/KR2022/004102; action dated Oct. 6, 2022; (2 pages).
(Continued)

*Primary Examiner* — Anthony R Jimenez
(74) *Attorney, Agent, or Firm* — K&L Gates LLP

(57) ABSTRACT

An air circuit breaker is disclosed. An air circuit breaker according to one aspect of the present disclosure includes a cradle and a circuit breaker main body drawn-in and drawn-out to/from the cradle; and further includes: an interlock lever connected to an off button of the circuit breaker main body to move vertically; and a transfer device unit provided on the lower side of the cradle, wherein the transfer device unit can include a key interlock assembly, which is provided to be horizontally movable so that, in a state of having moved toward one side thereof, the movement of the interlock lever is restricted and, in a state of having moved toward the other side thereof, the movement of the interlock lever is permitted.

20 Claims, 22 Drawing Sheets

(58) Field of Classification Search
CPC ...... H02B 11/173; H02B 13/00; H01H 31/00; H01H 31/02; H01H 31/04; H01H 31/06; H01H 31/08; H01H 9/20; H01H 9/22; H01H 9/223; H01H 9/24; H01H 9/26; H01H 3/00; H01H 3/02; H01H 3/04; H01H 9/02; H01H 9/28; H01H 9/285; H01H 2003/002; H01H 2300/06; H01H 2300/066
USPC ........................................................ 200/50.1
See application file for complete search history.

(56) References Cited

FOREIGN PATENT DOCUMENTS

| | | | |
|---|---|---|---|
| KR | 100854382 | B1 | 8/2008 |
| KR | 101486717 | B1 | 1/2015 |
| KR | 101667258 | B1 | 10/2016 |
| KR | 101896080 | B1 | 9/2018 |

OTHER PUBLICATIONS

Written Opinion for related International Application No. PCT/KR2022/004102; action dated Oct. 6, 2022; (4 pages).

* cited by examiner

AIR CIRCUIT BREAKER

CROSS-REFERENCE TO RELATED APPLICATION

This application is a National Stage of International Application No. PCT/KR2022/004102, filed on Mar. 24, 2022, which claims priority to and the benefit of Korean Patent Application No. 10-2021-0040461, filed on Mar. 29, 2021, and Korean Patent Application No. 10-2022-0002656, filed Jan. 7, 2022, the disclosure of which is incorporated herein by reference in its entirety.

FIELD

The present disclosure relates to an air circuit breaker, and more particularly, to an air circuit breaker having an interlock device for restraining or permitting the draw-in and draw-out and positional movement of a main body.

BACKGROUND

An air circuit breaker (ACB) is a device that is generally installed on low-voltage distribution lines and uses air as an arc extinguishing medium to perform transmission/reception, transfer, and stop of power systems in a planned manner, and to protect human life and peripheral devices by blocking circuits when abnormal currents occur.

Air circuit breakers are of a fixed type that is fixed in a specific place and a draw-out type that allows the circuit breaker main body to be drawn in and out of the cradle. In the case of a draw-out type circuit breaker, it is divided into a disconnect position, a test position, and a connect position according to the relative position of the circuit breaker main body inside the cradle.

In this case, the disconnect position is a state in which the circuit breaker main body is drawn out from the cradle, and the control power terminal is separated from the cradle (nonoperating state), the test position is a state in which the circuit breaker main body is drawn in into the cradle at a predetermined distance and the control power terminal is connected to the cradle to check a connection state of the circuit breaker, and the connect position is a state in which the circuit breaker main body is completely drawn in into the cradle and the main body terminal is connected to the cradle terminal to electric-current-conduct a main circuit (operating state).

The air circuit breaker is a circuit breaker installed at the top of the low voltage power reception and distribution system and protects the load end from high fault current. Therefore, the control of the air circuit breaker must be performed very carefully, and the circuit breaker must not be controlled by anyone other than the person concerned.

To this end, interlock devices are used in the air circuit breaker to prevent energization of an unauthorized main circuit and to prevent the position of the circuit breaker main body from being arbitrarily moved for the purpose of maintaining an operating or non-operating state or for user safety.

The interlock function is generally applied to the circuit breaker main body to prevent arbitrary power input, or applied to the cradle to prevent arbitrary positional movement of the circuit breaker main body. In other words, the interlock device is implemented as two interlocks applied to the circuit breaker main body and the cradle.

Meanwhile, there are cases in which several air circuit breakers are used together in a power distribution system. In this case, it is necessary to manage the air circuit breakers placed at the upper or lower level together. In addition, in the power source supplied to the circuit, when an emergency power source is additionally installed in addition to the general power source, the air circuit breaker to which a plurality of power sources are connected is provided with a double interlock device.

In such a complex situation, it has been required to develop an air circuit breaker capable of integrated control of the interlock device performing the interlock functions and easy maintenance and replacement.

SUMMARY

The present disclosure is to solve the above problems, and is directed to providing an air circuit breaker capable of simultaneously implementing a function of restraining the input operation of the circuit breaker main body and a function of restraining the positional movement of the circuit breaker main body inside the cradle.

The present disclosure is also directed to providing an air circuit breaker capable of maintaining the pushed state of the off button of the circuit breaker main body, and thus maintaining the input restriction function of the circuit breaker main body, while maintaining the positional movement restriction function of the circuit breaker main body.

The present disclosure is also directed to providing an air circuit breaker capable of easily maintaining, repairing and replacing an operating means for restricting an interlock device, and thus immediately reflecting a customer's demand.

The problems of the present disclosure are not limited to those mentioned above, and other problems not mentioned will be clearly understood by those of ordinary skill in the art from the following description.

According to an aspect of the present disclosure, an air circuit breaker is provided, including: a cradle and a circuit breaker main body drawn in and drawn out to/from the cradle; an interlock lever connected to an off button of the circuit breaker main body to move vertically; and a transfer device unit provided on the lower side of the cradle, wherein the transfer device unit has a key interlock assembly, which is provided to be horizontally movable so that, in a state of having moved toward one side thereof, the movement of the interlock lever is restricted and, in a state of having moved toward the other side thereof, the movement of the interlock lever is permitted.

In this case, a shutter plate installed to be horizontally movable and restricted or allowed to move according to the position of the interlock lever may be provided in the transfer device unit, and the key interlock assembly may restrict movement of the shutter plate in a state in which the key interlock assembly is moved in one direction and may allow movement of the shutter plate in a state in which the key interlock assembly is moved in the other direction.

In this case, the key interlock assembly may include a housing plate coupled to the transfer device unit; an interlock plate installed to be horizontally movable on the housing plate; and a key assembly that moves the interlock plate.

In this case, a key hole in which the key assembly is installed may be formed on the front surface of the housing plate.

In this case, a through hole may be formed on both side surfaces of the housing plate, respectively, to allow the interlock plate to slide.

In this case, a spring insertion part into which a plate return spring can be installed may be provided on the interlock plate.

In this case, a contact part subjected to force of the key assembly may be formed to protrude from the interlock plate.

In this case, a restraining part for limiting or allowing movement of the interlock lever may be bent and formed on the interlock plate.

In this case, the restraining part may be disposed at a height between intervals where the interlock lever moves upward and downward.

In this case, the key assembly may include a rotating cylinder rotated by a key and a lever rotating with the rotating cylinder may be provided at a rear portion of the key assembly.

In this case, a pressing part for applying force to the contact part may be bent and formed on the lever.

In this case, two of the key assemblies may be provided in a pair and at least one of the pair of key assemblies may be positioned at a specific position to fix the interlock plate in a locked position.

According to another aspect of the present disclosure, an air circuit breaker is provided, including: a cradle with one side surface open; a circuit breaker main body configured to be drawn in and drawn out to/from the one side surface of the cradle; an interlock lever connected to a button of the circuit breaker main body and configured to be located at a first position in a state in which the button is pressed, and located at a second position in a state in which the button is not pressed; a transfer device unit provided in the cradle to draw in and draw out the circuit breaker main body; and an interlock plate movably installed in the front of the transfer device unit to position and fix the interlock lever to the first position when the interlock plate is in a locked position, and to allow the interlock lever to be moved from the first position to the second position when the interlock plate is in an unlocked position.

In this case, the air circuit breaker may further include a cover plate covering an outer surface of the transfer device unit and having a hole formed thereon; and a shutter plate positioned between the transfer device unit and the cover plate and opening and closing the cover plate hole, wherein the interlock plate positions and fixes the shutter plate to a position where the cover plate hole is closed in a state where the interlock plate is moved to the locked position, and allows movement of the shutter plate to open and close the cover plate hole of the shutter plate in a state where the interlock plate is moved to the unlocked position.

In this case, the air circuit breaker may include an operating means for moving the interlock plate.

In this case, an accommodating groove for accommodating the operating means may be formed on an outer surface of the cover plate, and the interlock plate may be disposed on an inner surface of the cover plate.

In this case, the operating means may be a key assembly.

In this case, a key assembly hole through which the key assembly can pass may be formed on a bottom surface of the accommodating groove.

In this case, the cover plate may have a first guide protrusion respectively formed on both sides of the interlock plate along a motion direction of the interlock plate.

In this case, a second guide protrusion protruding toward the interlock plate may be formed on the cover plate, and a guide groove extending along a motion direction of the interlock plate and into which the second guide protrusion is inserted may be formed on the interlock plate.

According to the above configuration, the air circuit breaker according to an embodiment of the present disclosure can simultaneously implement a function of restricting the input operation of the circuit breaker main body and a function of restricting the positional movement of the circuit breaker main body inside the cradle by positioning the interlock plate at a locked position, fixing the interlock lever at a first position corresponding to a state in which the off button is pressed, and positioning the shutter plate at a position in which the handle insertion hole of the cover plate into which the handle is inserted is closed.

In addition, the air circuit breaker according to an embodiment of the present disclosure can maintain the function of the positional movement restriction of the circuit breaker main body while maintaining the function of the input restriction of the circuit breaker main body by operating the key assembly to fix the interlock plate at a position in which the movement of the interlock lever and the shutter plate is restricted.

In addition, the air circuit breaker according to an embodiment of the present disclosure may separate the key assembly in a state in which the key assembly is not detached from the air circuit breaker by providing an accommodating groove in which the key assembly is accommodated at an outer surface of the cover plate and the interlock plate is disposed at an inner surface of the cover plate, and thus may easily maintain, repair and replace the key assembly, thereby immediately reflecting a customer's demand.

In addition, the air circuit breaker according to an embodiment of the present disclosure may include two sets of key assemblies that operate the interlock plate, so that it can be used in parallel with two or more other circuit breakers.

Advantageous effects of the present disclosure are not limited to the above-described effects, and should be understood to include all effects that can be inferred from the configuration of the disclosure described in the detailed description or claims of the present disclosure.

BRIEF DESCRIPTION OF THE DRAWINGS

FIGS. 2 and 3 are perspective views of the air circuit breaker according to the first embodiment of the present disclosure, in which FIG. 2 is a state in which the circuit breaker main body and the cradle are separated, and FIG. 3 is a state in which the circuit breaker main body is drawn-in into the cradle. At this time, only the components necessary for the understanding of the present disclosure are shown, and the housing and other components are omitted.

FIGS. 11 and 12 are front views of the air circuit breaker, in which FIG. 11 shows a key interlock unlocked state, and FIG. 12 shows a key interlock locked state.

FIGS. 14 to 17 are views showing a state in which the key assembly and the interlock plate according to the first embodiment of the present disclosure are viewed from a transfer module side toward a cover plate side, in which FIG. 14 is a view showing a state in which both first and second key assemblies are released, FIG. 15 is a view showing a case where the first key assembly is in a locked state and the second key assembly is in an unlocked state, FIG. 16 is a view showing a case where the first key assembly is in an unlocked state and the second key assembly is in a locked state, and FIG. 17 is a view showing a case where both the first and second key assemblies are in a locked state.

FIGS. 26 to 29 are views showing a state in which the key assembly and the interlock plate according to the second embodiment of the present disclosure are viewed from a transfer module side toward a cover plate side, in which FIG. 26 is a view showing a state in which both first and second key assemblies are released, FIG. 27 is a view showing a case where the first key assembly is in a locked state and the second key assembly is in an unlocked state, FIG. 28 is a view showing a case where the first key assembly is in an unlocked state and the second key assembly is in a locked state, and FIG. 29 is a view showing a case where both the first and second key assemblies are in a locked state.

DETAILED DESCRIPTION

Figure 1:
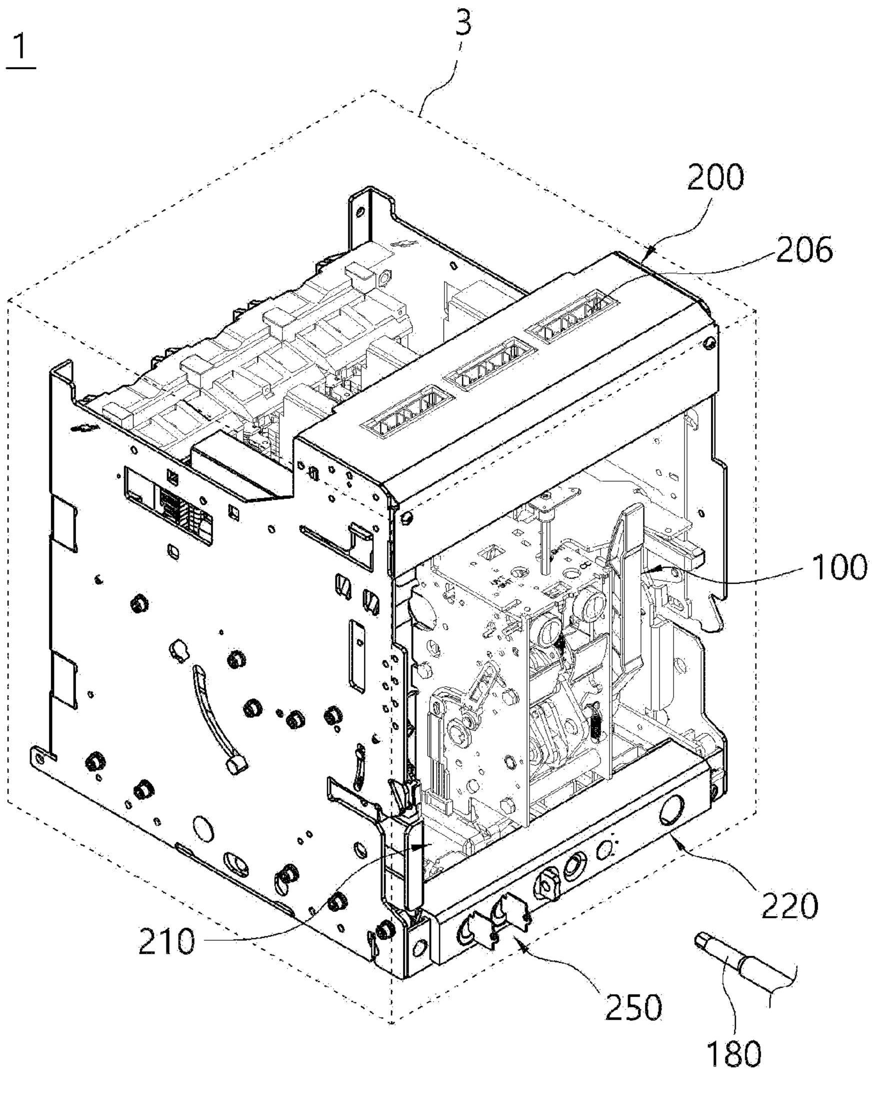
FIG. 1 is a perspective view of an air circuit breaker according to a first embodiment of the present disclosure. In this case, for the purpose of explaining the disclosure, the housing is indicated by a dotted line, and the configuration seen through the housing is indicated by a solid line.

Hereinafter, exemplary embodiments of the present disclosure will be described in detail so that those of ordinary skill in the art can readily implement the present disclosure with reference to the accompanying drawings. The present disclosure may be embodied in many different forms and is not limited to the embodiments set forth herein. In the drawings, parts unrelated to the description are omitted for clarity of description of the present disclosure, and throughout the specification, like reference numerals denote like elements.

Terms and words used in the present specification and claims should not be construed as limited to their usual or dictionary definition, and they should be interpreted as a meaning and concept consistent with the technical idea of the present disclosure based on the principle that inventors may appropriately define the terms and concept in order to describe their own disclosure in the best way.

It should be understood that the terms "comprise" or "have" when used in this specification, are intended to describe the presence of stated features, integers, steps, operations, elements, components and/or a combination thereof but not preclude the possibility of the presence or addition of one or more other features, integers, steps, operations, elements, components, or a combination thereof.

The presence of an element in/on "front", "rear", "upper or above or top" or "lower or below or bottom" of another element includes not only being disposed in/on "front", "rear", "upper or above or top" or "lower or below or bottom" directly in contact with other elements, but also cases in which another element being disposed in the middle, unless otherwise specified. In addition, unless otherwise specified, that an element is "connected" to another element includes not only direct connection to each other but also indirect connection to each other.

Figure 2:
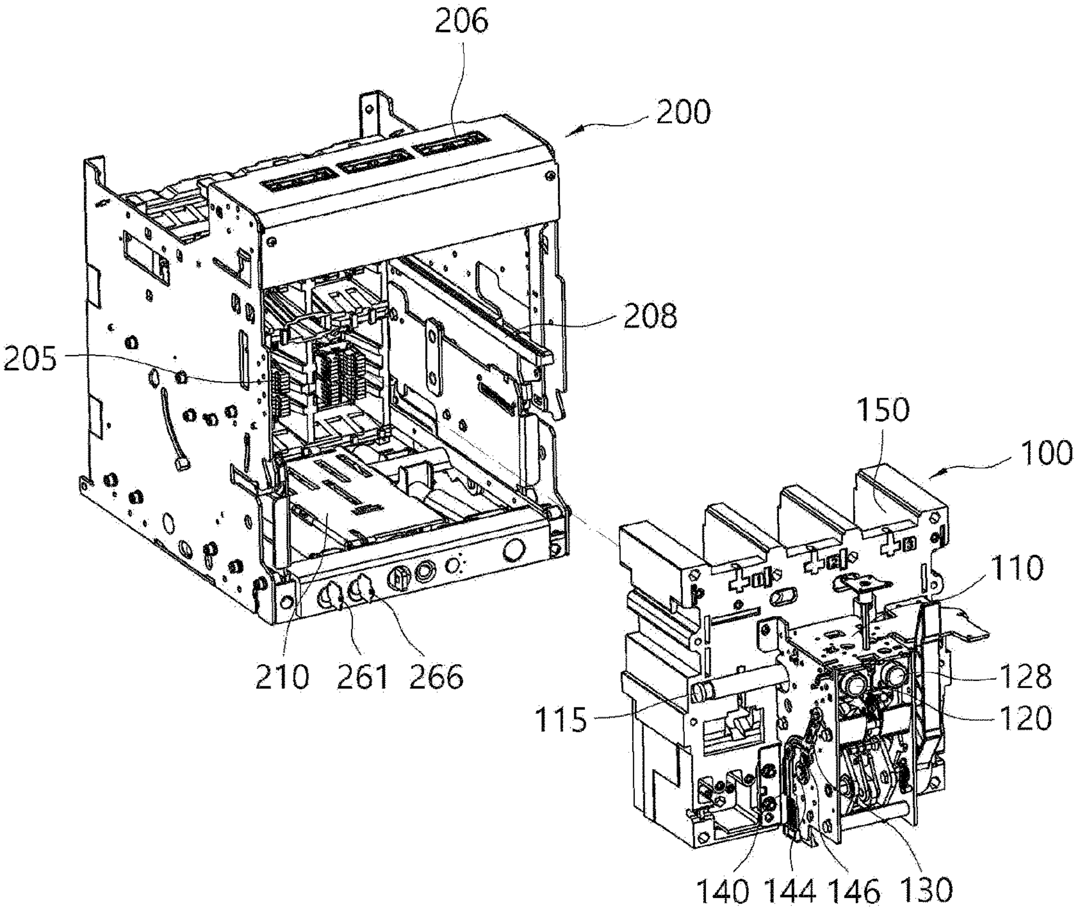
Figure 3:
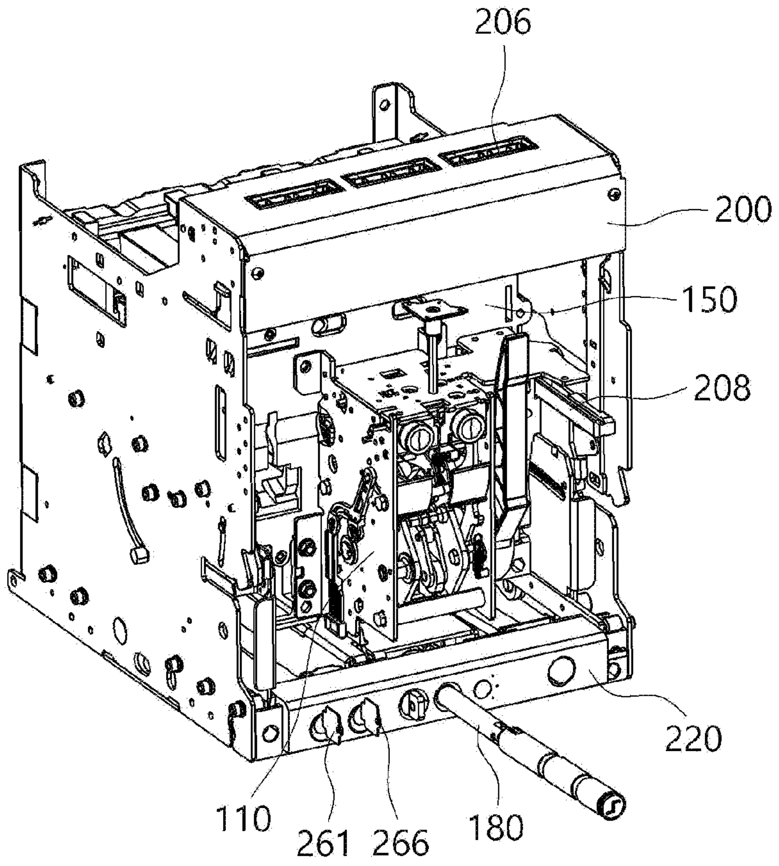
Figure 4:
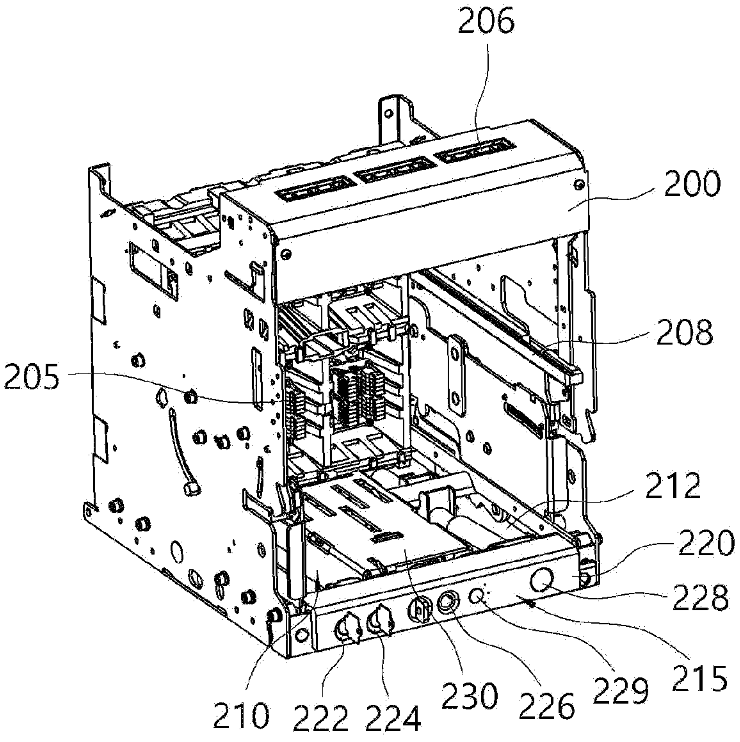
FIG. 4 is a perspective view of a cradle according to the first embodiment of the present disclosure.
Figure 5:
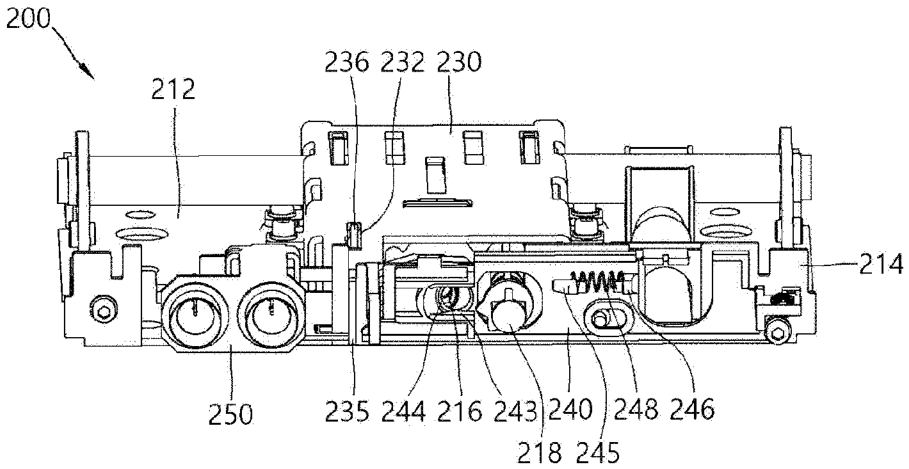
FIG. 5 is a perspective view of a transfer device unit on the lower side of the cradle according to the first embodiment of the present disclosure shown in FIG. 4.
Figure 6:
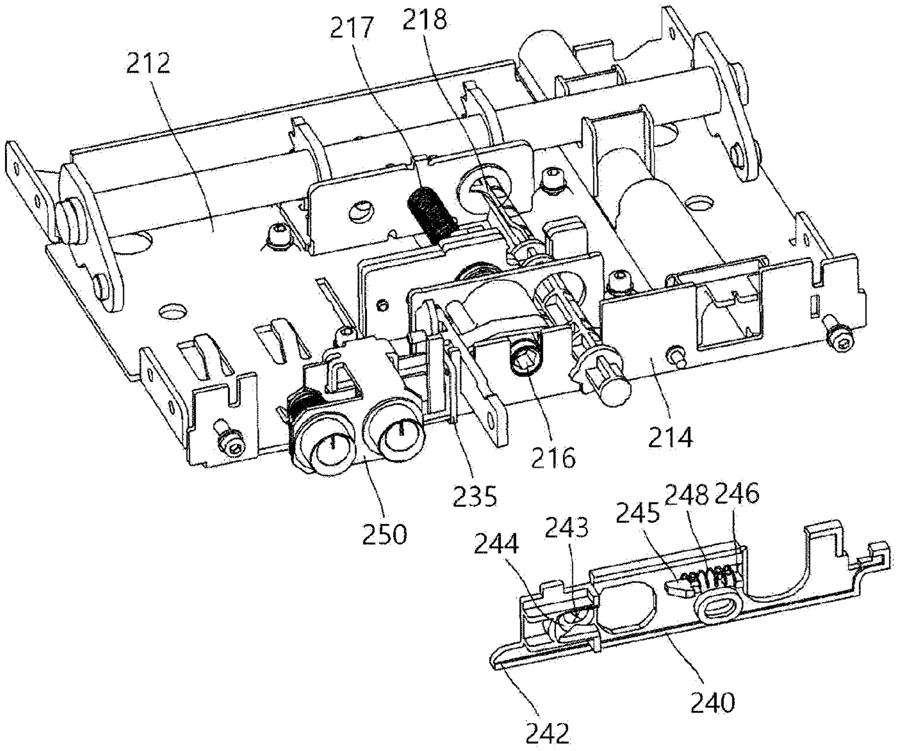
FIG. 6 is a perspective view of a transfer device unit according to the first embodiment of the present disclosure in a state in which a shutter plate is separated in FIG. 5. In this case, for the purpose of description of the disclosure, the transfer unit cover plate is removed.
Figure 7:
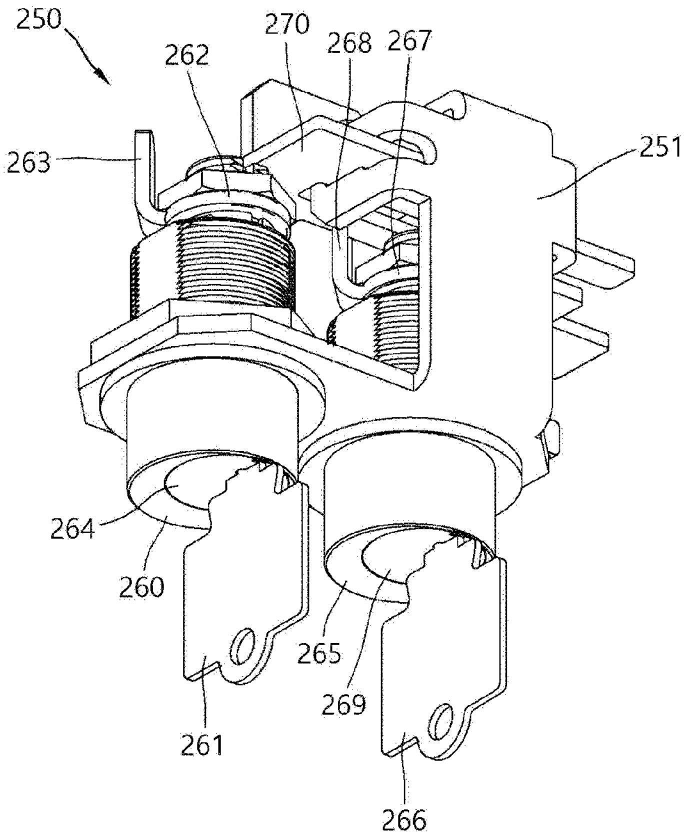
FIG. 7 is a perspective view of a key interlock assembly according to the first embodiment of the present disclosure.
Figure 8:
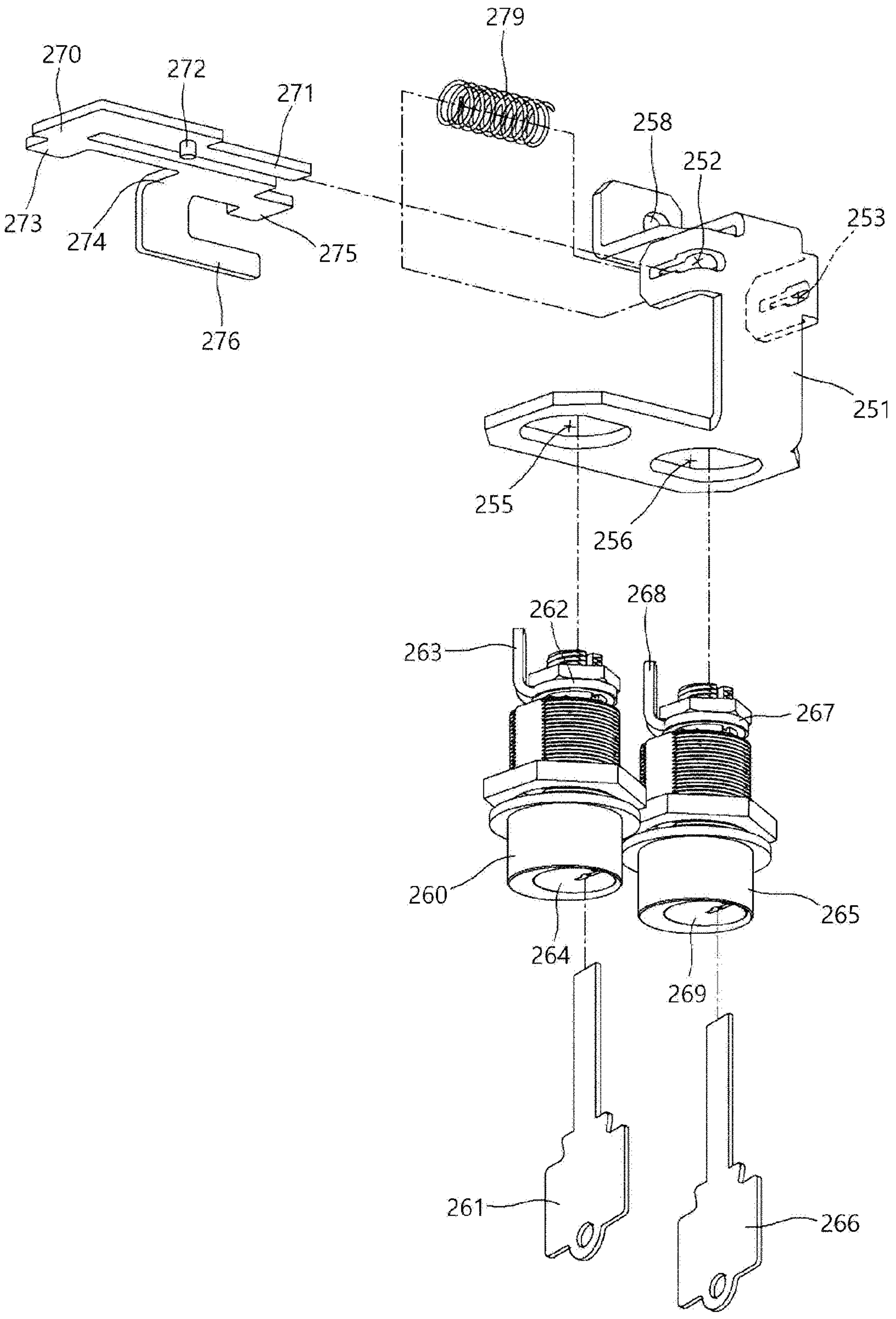
FIG. 8 is an exploded perspective view of the key interlock assembly according to the first embodiment of the present disclosure shown in FIG. 7.

An air circuit breaker according to each embodiment of the present disclosure will be described in detail with reference to the drawings. FIG. 1 is a perspective view of an air circuit breaker according to a first embodiment of the present disclosure. In this case, for the purpose of explaining the disclosure, the housing is indicated by a dotted line, and the configuration seen through the housing is indicated by a solid line. FIGS. 2 and 3 are perspective views of the air circuit breaker according to the first embodiment of the present disclosure, in which FIG. 2 is a state in which the circuit breaker main body and the cradle are separated, and FIG. 3 is a state in which the circuit breaker main body is drawn-in into the cradle. At this time, only the components necessary for the understanding of the present disclosure are shown, and the housing and other components are omitted. FIG. 4 is a perspective view of a cradle according to the first embodiment of the present disclosure. FIG. 5 is a perspective view of a transfer device unit on the lower side of the cradle according to the first embodiment of the present disclosure shown in FIG. 4. FIG. 6 is a perspective view of a transfer device unit according to the first embodiment of the present disclosure in a state in which a shutter plate is separated in FIG. 5. In this case, for the purpose of description of the disclosure, the transfer unit cover plate is removed. FIG. 7 is a perspective view of a key interlock assembly according to the first embodiment of the present disclosure. FIG. 8 is an exploded perspective view of the key interlock assembly according to the first embodiment of the present disclosure shown in FIG. 7.

Figure 9:
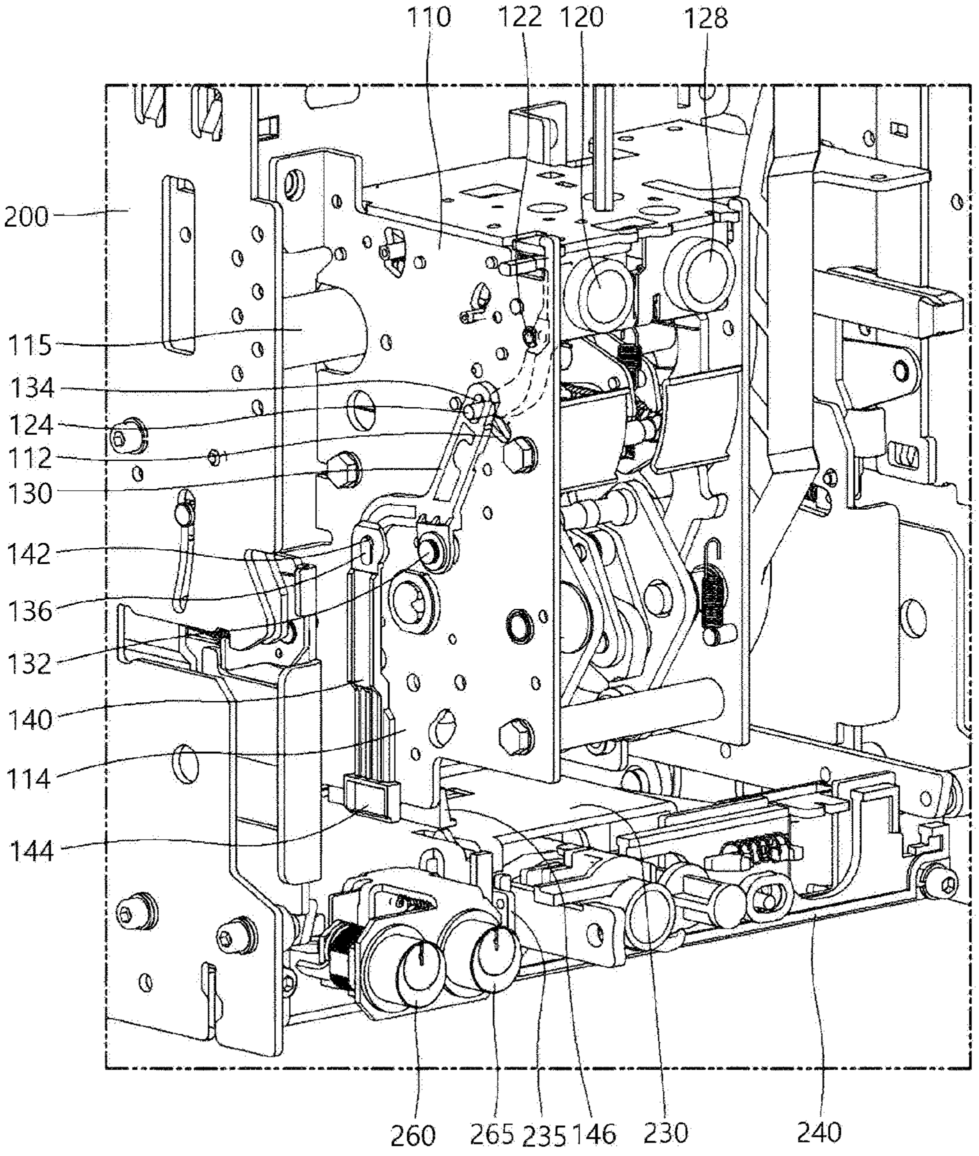
FIG. 9 is a partial perspective view of a state in which the circuit breaker main body is drawn-in into the cradle, according to the first embodiment of the present disclosure.
Figure 10:
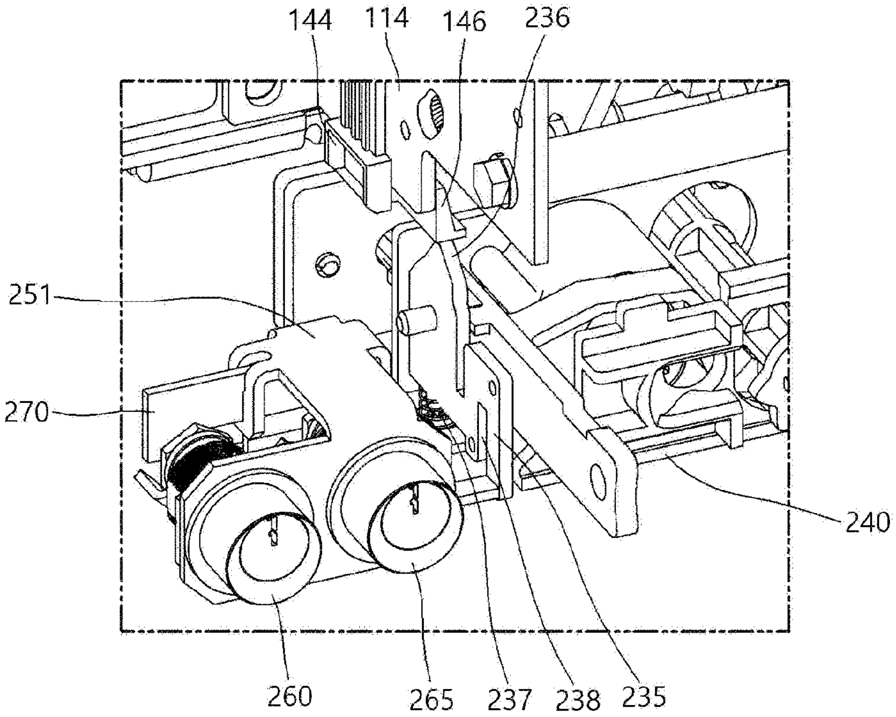
FIG. 10 is a detailed view of the key interlock assembly portion shown in FIG. 9 viewed from another angle.

FIG. 9 is a partial perspective view of a state in which the circuit breaker main body is drawn-in into the cradle, according to the first embodiment of the present disclosure. FIG. 10 is a detailed view of the key interlock assembly portion shown in FIG. 9 viewed from another angle.

Referring to FIGS. 1 to 4, the air circuit breaker 1 according to the first embodiment of the present disclosure includes a housing 3; a cradle 200; and a circuit breaker main body 100 drawn-in and drawn-out to/from the cradle 200, and further includes: an interlock lever 235 connected to an off button 120 of the circuit breaker main body 100 to move vertically; and a shutter plate 240 that is installed to be horizontally movable in the transfer device unit 210 provided on the lower side of the cradle 200 and whose movement is limited or permitted according to the position of the interlock lever 235, wherein the transfer device unit 210 can include a key interlock assembly 250, which is installed to be horizontally movable so that, in a state of having moved toward one side thereof (locked state), the movement of the interlock lever 235 and the shutter plate 240 is restricted and, in a state of having moved toward the other side thereof (unlocked state), the movement of the interlock lever 235 and the shutter plate 240 is permitted.

In this case, an accommodation space for accommodating the cradle 200 and the circuit breaker main body 100 may be provided in the housing 3. The housing 3 may perform a function of protecting the main components of the air circuit breaker 1 from external impacts or the like. A plurality of holes may be formed in the housing 3 so that components for of operating the cradle 200 and the circuit breaker main body 100 and components constituting the distribution line may be exposed to the outside.

Here, the key interlock assembly 250 includes a housing plate 251 fixed to the transfer device unit 210; and an interlock plate 270 installed to be linearly movable on the housing plate 251 to limit the lowering of the interlock lever 235 and the movement of the shutter plate 240.

In FIGS. 1 to 3, the circuit breaker main body 100 and the cradle 200 are shown. Here, the circuit breaker main body 100 and the cradle 200 are shown so that the internal configuration is visible, and only the main parts are shown and other parts are omitted so as to easily understand the gist of the present disclosure.

The circuit breaker main body 100 includes a contact point part (not shown), an opening/closing mechanism unit 110 providing mechanical force to open and close the contact point part, a tripping unit, an arc extinguishing unit 150, and the like.

An on button 128 and an off button 120 are provided in the opening/closing mechanism unit 110 to open and close the contact point part. When the on button 128 or the off button 120 is pressed, a main shaft 115 is rotated clockwise or counterclockwise by the power of the opening/closing mechanism unit 110 to open and close the contact point part. That is, the main circuit is cut off or energized.

The off button 120 is shown in more detail in FIG. 9. The off button 120 is installed to be rotatable with respect to a rotation shaft 122. When the user presses the off button 120, the button moves in a way of lying on its back and rotates counterclockwise with respect to the rotation shaft 122 (when viewed from the left side of FIG. 9). The off button 120 is provided with a torsion spring and returns to its original position when the external force is removed.

A locking part 124 is formed to protrude from the lower end of the off button 120. The locking part 124 may be installed to protrude through the side surface of the opening/closing mechanism unit 110. An off button action hole 112 is formed on one side surface of the opening/closing mechanism unit 110, and the locking part 124 passes through the off button action hole 112 and extends to the outside of the opening/closing mechanism unit 110. The locking part 124 operates interlock connection members 130 and 140.

The interlock connection members 130 and 140 are provided on one side of the opening/closing mechanism unit 110. The interlock connection members 130 and 140 may be installed on a side plate 114 of the opening/closing mechanism unit 110.

A switching member 130 is provided. The switching member 130 transmits the operation of the off button 120 to an elevation member 140. The switching member 130 functions to switch the rotational motion of the locking part 124 of the off button 120 to the elevating motion of the elevation member 140 while performing the rotational motion. The switching member 130 may be formed in a plate shape having two arms extending to be opened at an appropriate angle around a switching member rotation shaft 132 provided in the middle portion.

A locking hole 134 is formed at one end of the switching member 130. The locking part 124 of the off button 120 is inserted into the locking hole 134 and the motion of the off button 120 is transmitted to the switching member 130. The locking part 124 operates the switching member 130 while performing a predetermined sliding motion within the locking hole 134.

A hook 136 is formed at the other end of the switching member 130. The motion of the switching member 130 is transmitted to the elevation member 140 through the hook 136. The arm with the other end of the switching member 130 is bent in the form of a bow, so that the hook 136 moves in close to linear motion up and down.

The elevation member 140 is provided to move up and down. The elevation member 140 may move up and down by being inserted into a groove formed at the lower end of the side portion of the opening/closing mechanism unit 110.

A hook hole 142 into which the hook 136 of the switching member 130 is inserted is formed at one end (upper end) of the elevation member 140. The elevation member 140 moves up and down by receiving the force of the hook 136 inserted into the hook hole 142.

An action part 144 is formed at the other end (lower end) of the elevation member 140. The action part 144 may move up and down by being inserted into a groove formed at the lower end of the side portion of the opening/closing mechanism unit 110.

An action plate 146 is formed to protrude from the action part 144. Here, the action part 144 is installed to be disposed outside the side plate 114 of the opening/closing mechanism unit 110, and the action plate 146 is installed to be disposed inside the side plate 114 of the opening/closing mechanism unit 110. The action plate 146 moves the interlock lever 235 (see FIG. 10).

When the off button 120 is pressed, the off button 120 rotates counterclockwise, and interlocked with this, the switching member 130 rotates clockwise, and the elevation member 140 moves upward.

When the force of pressing the off button 120 is removed, the off button 120 rotates clockwise to return to the original position by the restoring force of the torsion spring, and interlocked with this, the switching member 130 rotates counterclockwise, and the elevation member 140 moves downward.

The on button 128 is disposed adjacent to the off button 120. The on button 128 operates the opening/closing mechanism unit 110 to allow the input operation to occur. In this case, the main circuit is energized. When the opening/closing mechanism unit 110 causes the input operation to occur, a movable contact of the contact point part contacts a fixed contact and the main circuit is energized.

The on button 128 is not operated in a state where the off button 120 is pressed. That is, the on button 128 operates only in a state where the off button 120 is not pressed.

The cradle 200 is formed in the shape of a box with the front side open, and the circuit breaker main body 100 is drawn in and out therein/therefrom. The cradle 200 supports the circuit breaker main body 100, and moves the circuit breaker main body 100 to a disconnected position, a test position, and a service position (connected position) and may be fixed at each position. The cradle 200 is connected to the main circuit to mediate the connection between the circuit breaker main body 100 and the main circuit.

A cradle terminal 205 is provided on the rear surface portion (the rear surface plate) of the cradle 200. The cradle terminal 205 includes a power side terminal and a load side terminal, and the power side terminal and the load side terminal are provided for each phase. For example, in the case of a three-phase circuit breaker, three power side terminals and three load side terminals are provided, respectively.

An arc box (not shown) is provided on the upper surface portion of the cradle 200. The arc gas flowing out of the extinguishing unit 150 of the circuit breaker main body 100 is discharged to the outside through the arc box.

A control power unit 206 may be provided on the upper surface portion (the upper surface plate) of the cradle 200. The control power unit 206 may perform a maintenance operation such as testing a breaking operation or removing residual current in a state in which the cradle 200 and the circuit breaker main body 100 are not connected to the main circuit.

Mechanisms for assisting the draw in and out of the circuit breaker main body 100 may be installed on the side surface of the cradle 200. For example, a guide 208 may be provided inside the side surface of the cradle 200.

A transfer device unit 210 for supporting the circuit breaker main body 100 and at the same time moving the circuit breaker main body 100 is provided on the lower surface portion of the cradle 200. The transfer device unit 210 includes a base plate 212, a front operation unit 215, a transfer unit cover plate 230, and the like.

Describing first to the transfer device unit 210, the base plate 212 forms a lower surface of the transfer device unit 210. The front operation unit 215 may perform operations such as inserting the handle 180 to move the circuit breaker main body 100, displaying the position of the circuit breaker main body 100, and restricting the movement of the circuit breaker main body 100. The transfer unit cover plate 230 protects a draw-in and draw-out device such as a screw.

The cradle 200 is shown in FIG. 4, and the transfer device unit 210 is shown in FIGS. 5 and 6. In FIG. 5, it is shown that the front cover plate 220 of the front operation unit 215 is removed, and in FIG. 6, it is shown that the transfer unit cover plate 230 is removed, and the shutter plate 240 is separated.

The base plate 212 forms the lower surface of the cradle 200 and also forms the lower surface of the transfer device unit 210. A draw-in and draw-out device is installed on the upper surface of the base plate 212, and a front operation unit 215 is provided on the front surface.

A draw-in and draw-out operation assembly is installed at the middle portion of the base plate 212. The draw-in and draw-out operation assembly includes a draw-in and draw-out screw 217 and a position indicating screw 218.

The draw-in and draw-out screw 217 providing power to move the circuit breaker main body 100 forward and backward by the force of the handle 180 is disposed in the longitudinal direction at the center portion, and the position indicating screw 218 is disposed side by side next to the draw-in and draw-out screw 217. An insertion groove 216 formed in a polygonal shape (for example, a hexagonal shape) is formed at the front end portion of the draw-in and draw-out screw 217 to fit the handle 180 to transmit power.

The front surface portion 214 of the base plate 212 is bent from the lower surface to form a front surface. The front cover plate 220 is coupled to the front surface portion 214 of the base plate 212. Various grooves are formed in the front surface portion 214 of the base plate 212 so that the draw-in and draw-out screw 217 or the position indicating screw 218 or the like may be exposed.

An interlock lever 235 is installed on the base plate 212. The interlock lever 235 is best shown in FIG. 10. The interlock lever 235 is installed to be movable up and down. The interlock lever 235 is subjected to an upward force by a lever return spring 537. Accordingly, the interlock lever 235 is in an elevated position in a normal state in which no external force is applied.

In the normal state, a head part 236 of the interlock lever 235 protrudes above the transfer unit cover plate 230 through a lever motion hole 232 of the transfer unit cover plate 230 (see FIG. 5). The head part 236 of the interlock lever 235 is in contact with the action plate 146 of the elevation member 140 (see FIGS. 9 and 10). Therefore, when the off button 120 is pressed, the interlock lever 235 rises as the elevation member 140 rises, and when the off button 120 returns to the original position, the interlock lever 235 falls as the elevation member 140 falls.

Hereinafter, the position of the interlock lever 235 lifted as the off button 120 is pressed is referred to as a first position, and the position of the interlock lever 235 lowered as the off button 120 returns to the original position is referred to as a second position.

The interlock lever 235 may be formed in the shape of a plate, and a portion of the interlock lever 235 protrudes forward from the front surface portion 214 of the base plate 212. When the interlock lever 235 is in a lowered state (i.e., positioned at the second position), the interlock lever 235 prevents movement of the shutter plate 240. That is, in the state where the interlock lever 235 is lowered because the off button 120 is not pressed, the shutter plate 240 is caught by the interlock lever 235 to limit movement to the left.

As will be described again below, when the left movement of the shutter plate 240 is restricted as described above, the handle 180 cannot be inserted, and thus the movement of the circuit breaker main body 100 is impossible. In other words, only in a state where the interlock lever 235 is lifted by pressing the off button 120 (i.e., a state positioned at the first position), the left movement of the shutter plate 240 is possible, and in this case, the movement of the circuit breaker main body 100 is possible.

Through holes through which the components of the front operation unit 215 may be exposed are formed in the front cover plate 220 (see FIG. 4). For example, a first key assembly insertion hole 222, a second key assembly insertion hole 224, a handle insertion hole 226, a handle storage hole 228, a position indicating screw hole 229, and the like are formed in the front cover plate 220.

A shutter plate 240 is provided in the front operation unit 215. The shutter plate 240 is disposed in the front of the front surface portion 214 of the base plate 212 and installed inside the front cover plate 220 to be linearly movable left and right.

A movement limiting part 242 is provided at the lower end of the left end of the shutter plate 240. The movement limiting part 242 may be formed to protrude from the lower portion of the left end of the shutter plate 240. In a state in which the interlock lever 235 is lifted, the restraint on the shutter plate 240 is released, and the shutter plate 240 can move to the left. However, in a state where the interlock lever 235 is lowered (i.e., a state positioned at the second position), the movement limiting part 242 is caught by the interlock lever 235 to limit the left movement of the shutter plate 240.

A shutter portion handle insertion hole 243 into which the handle 180 may be inserted is formed in the shutter plate 240. Here, the shutter portion handle insertion hole 243 is formed such that only a portion of the insertion groove 216 of the draw-in and draw-out screw 217 is exposed in a normal state where the shutter portion handle insertion hole is not subjected to external force (see FIGS. 5 and 6). That is, the shutter plate 240 has an insertion prevention part 244 formed at a portion (the left portion in the drawing) adjacent to the shutter portion handle insertion hole 243. Insertion of the handle 180 is restricted by the insertion prevention part 244.

When the off button 120 is not pressed, the interlock lever 235 is in a lowered state (i.e., a state positioned at the second position), so that the movement of the shutter plate 240 is restricted and thus the insertion of the handle 180 is restricted by the insertion prevention part 244. That is, since the handle 180 cannot be inserted into the insertion groove 216 of the draw-in and draw-out screw 217, movement of the circuit breaker main body 100 is restricted.

When the off button 120 is pressed, the interlock lever 235 is in a lifted state (i.e., a state positioned at the first position), and thus the movement of the shutter plate 240 is allowed, and the handle 180 may be inserted into the insertion groove 216 of the draw-in and draw-out screw 217 through the shutter portion handle insertion hole 243. Therefore, movement of the circuit breaker main body 100 is possible.

A shutter return spring 248 is provided to provide force to return the shutter plate 240 to its original position. Spring fixing parts 245 and 246 are provided on the shutter plate 240 so that the shutter return spring 248 can be installed. A portion of the shutter return spring 248 is fixed to a portion of the front cover plate 220.

In a normal state in which no external force acts, the shutter plate 240 is in a state of partially covering the insertion groove 216 by moving to the right. When the handle 180 is inserted into the handle insertion hole 226 in a state in which the restraint by the interlock lever 235 is unlocked, the insertion prevention part 244 is pushed by the handle 180 so that the shutter plate 240 moves to the left, and the user may rotate the draw-in and draw-out screw 217 by inserting the handle 180 into the insertion groove 216 of the draw-in and draw-out screw 217. When the handle 180 is removed, the shutter plate 240 returns to the original position by the restoring force of the shutter return spring 248.

A key interlock assembly 250 is provided. A perspective view of the key interlock assembly 250 is shown in FIG. 7, and an exploded perspective view of the interlock lever 235 is shown in FIG. 8.

The key interlock assembly 250 is provided to simultaneously perform a function of preventing insertion of the main body and a function of limiting a positional movement of the circuit breaker main body 100 to each position. The key interlock assembly 250 includes a housing plate 251, a first key assembly 260, a second key assembly 265, and an interlock plate 270.

The housing plate 251 may be formed in a box shape or a plate having six sides of upper, lower (bottom), left, right, front, and rear. Through holes are formed on both left and right sides of the housing plate 251, respectively. That is, a first side surface through hole 252 is formed on a first side surface of the housing plate 251, and a second side surface through hole 253 is formed on a second side surface of the housing plate 251. The interlock plate 270 may move through the through holes 252 and 253 of the housing plate 251.

A first key hole 255 into which the first key assembly 260 may be inserted and fixed and a second key hole 256 through which the second key assembly 265 may be inserted and fixed are formed on the front surface of the housing plate 251.

A fixing hole 258 is formed at the bottom surface of the housing plate 251 so that the housing plate 251 can be fixedly installed on the base plate 212.

A first key assembly 260 and a second key assembly 265 are provided. The first key assembly 260 can be rotated with a first key 261 (i.e., switching to an unlocked or locked state), and the second key assembly 265 can be rotated with a second key 266 (i.e. switching to an unlocked or locked state). Here, each of the keys 261 and 266 may be drawn out only in a locked state of each of the key assemblies 260 and 265. That is, each of the keys 261 and 266 cannot be pulled out when the respective key assemblies 260 and 265 are unlocked.

A first key lever 262 rotating together with a first rotating cylinder 264 of the key assembly is provided at the rear of the first key assembly 260, and a second key lever 267 rotating together with a second rotating cylinder 269 of the key assembly is provided at the rear of the second key assembly 265.

Pressing parts 263 and 268 capable of moving the interlock plate 270 are bent and formed at each key lever 262 and 267, respectively.

The interlock plate 270 is installed to be linearly movable left and right to the housing plate 251. The interlock plate 270 slides through the through holes 252 and 253 of the housing plate 251.

A spring insertion part 271 into which a plate return spring 279 can be installed is provided in the interlock plate 270. A stop pin 272 is provided on one side of the spring insertion part 271 in the interlock plate 270. When the interlock plate 270 is moved leftward while being installed on the housing plate 251, it is caught by the stop pin 272 on the first side surface and does not come off.

The plate return spring 279 is inserted into the spring insertion part 271. The plate return spring 279 is installed between the second side surface of the housing plate 251 and the spring insertion part 271 of the interlock plate 270. Thus, in a normal state in which no external force is applied, the interlock plate 270 is in a state of moving to the left (in a direction away from the interlock lever). When the interlock plate 270 is moved to the right (in a direction of approaching the interlock lever) by the action of the external force (the locking action of the key), elastic force is stored in the plate return spring 279, and when the external force is removed, the interlock plate 270 is returned to its original position (moved to the left) by the restoring force of the plate return spring 279.

A first contact part 273 and a second contact part 274 are respectively formed to protrude from the interlock plate 270. The first contact part 273 is a part to which the first pressing part 263 of the first key assembly 260 contacts and receives force, and the second contact part 274 is a part to which the second pressing part 268 of the second key assembly 265 contacts and receives force.

A support part 275 is provided on the interlock plate 270. When the interlock plate 270 is in a locked state, the support part 275 is inserted into a groove 238 of the interlock lever 235 to support the interlock lever 235.

A restraining part 276 is bent and formed on the interlock plate 270. The interlock plate 270 may be formed as a vertical plate, and the restraining part 276 may be formed as a horizontal plate.

The restraining part 276 is disposed at the lower end height of the normal state interlock lever 235. That is, the restraining part 276 is caught by the interlock lever 235 in a normal state in which no external force is applied and thus prevents the interlock plate 270 from moving to the right. That is, the interlock plate 270 can be moved to the right only when the off button 120 is pressed and the interlock lever 235 is elevated (i.e., positioned at the first position). In other words, locking by the key interlock assembly 250 is possible only when the off button 120 is pressed.

When the off button 120 is pressed and the interlock lever 235 is elevated, the restraining part 276 may enter below the interlock lever 235.

In a state in which the off button 120 is pressed, when the first key assembly 260 or the second key assembly 265 rotates to the locked state and the interlock plate 270 moves to the right, the lowering of the interlock lever 235 is restricted by the restraining part 276, and thus the off state is maintained. In addition, since the movement of the shutter plate 240 is also restricted by the restraining part 276, the handle 180 cannot be inserted, so the movement of the circuit breaker main body 100 is also restricted. Hereinafter, the position of the interlock lever 235 as above is referred to as a locked position.

Hereinafter, the action of the air circuit breaker according to the first embodiment of the present disclosure will be described.

Figure 11:
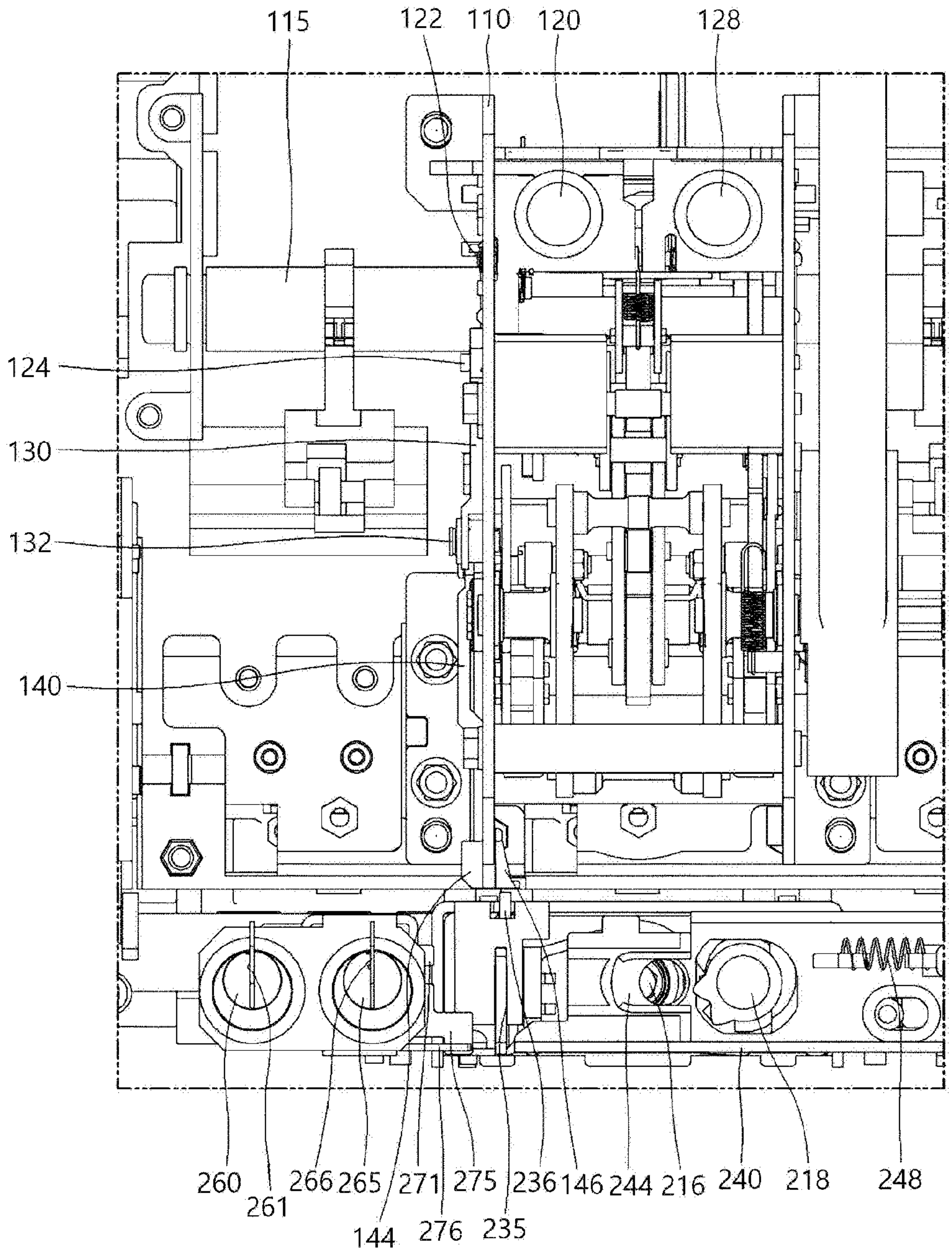
Figure 12:
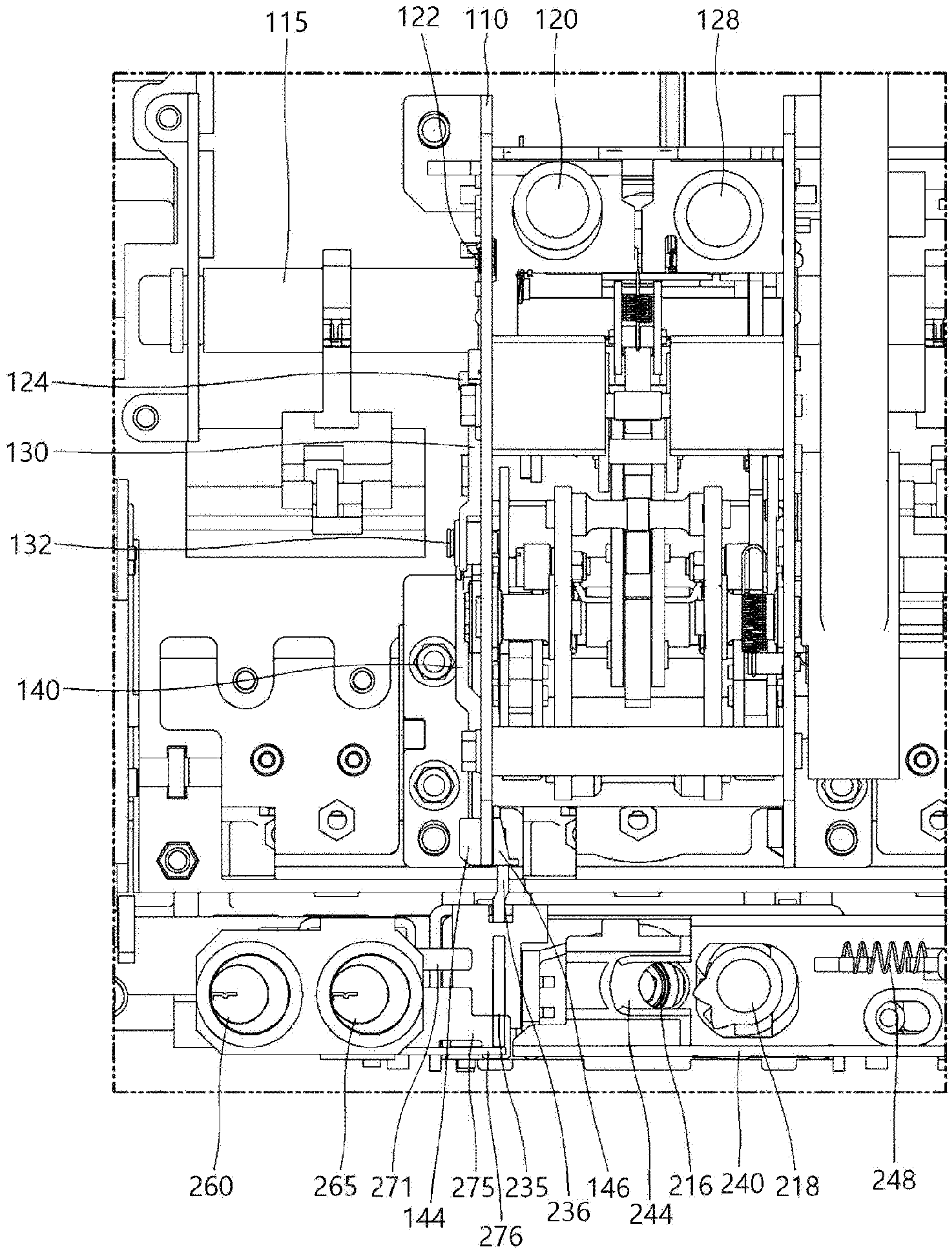
Figure 13:
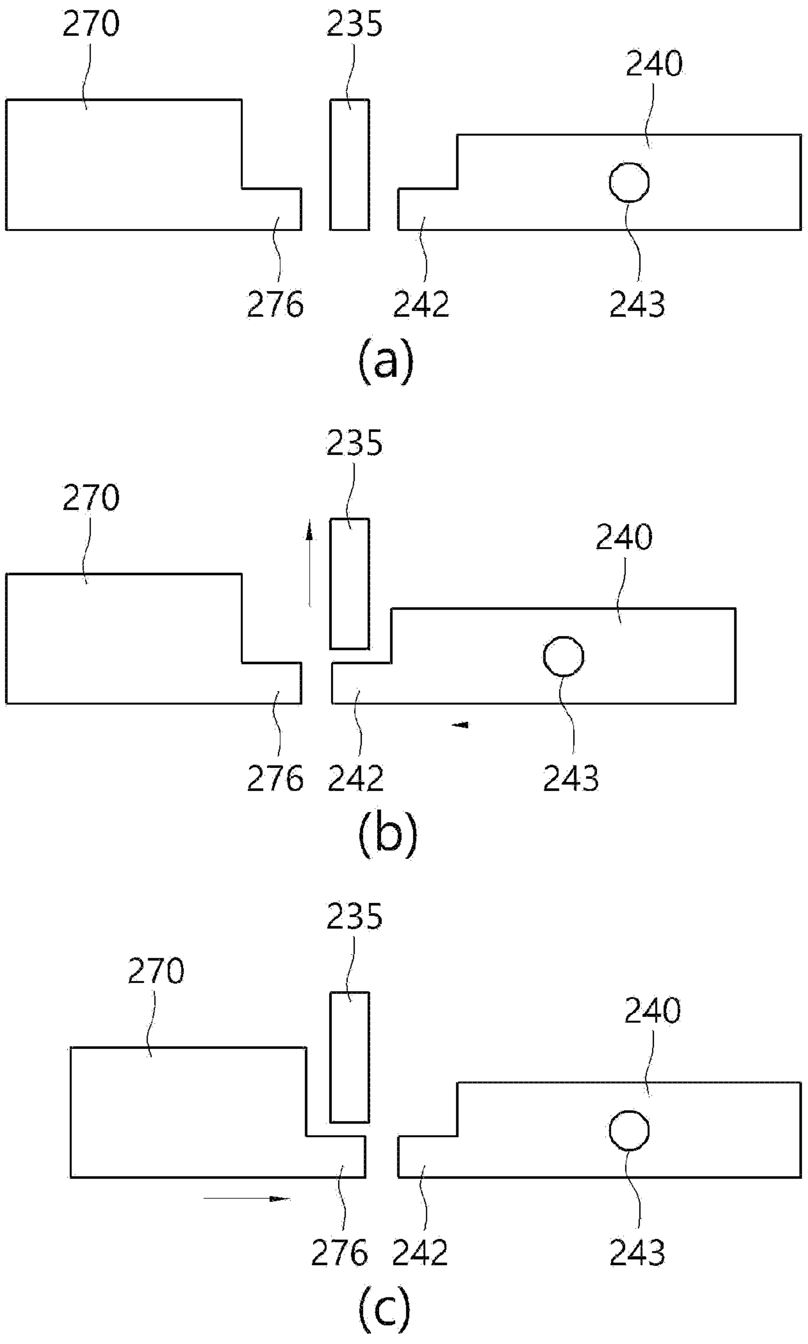
FIG. 13 is a view illustrating an operation process of an interlock plate, a shutter plate, and an interlock lever according to the first embodiment of the present disclosure. For purposes of description of the disclosure, each component is shown briefly.

FIGS. 11 and 12 are front views of the air circuit breaker, in which FIG. 11 shows a key interlock unlocked state, and FIG. 12 shows a key interlock locked state. FIG. 13 is a view illustrating an operation process of an interlock plate, a shutter plate, and an interlock lever according to the first embodiment of the present disclosure. For purposes of description of the disclosure, each component is shown briefly.

When the circuit breaker main body 100 is in the operating position, as shown in FIG. 11, in a state where the off button 120 is not pressed, the main circuit can be energized by pressing the on button 128.

Referring to FIGS. 11 and 13(*a*), since the interlock lever 235 is in a lowered state (i.e., a state positioned at the second position), the movement of the shutter plate 240 is restricted and thus the movement of the circuit breaker main body 100 is restricted.

As shown in FIG. 12, in a state in which the off button 120 is pressed, the force restraining the interlock lever 235 is removed by the switching member 130 and the elevation member 140 interlocked therewith, and the interlock lever 235 is in an elevated state (i.e., a state positioned at the first position) by the force of the interlock return spring 237.

Referring to FIGS. 12 and 13(*b*), as such when the interlock lever 235 is positioned at the first position, the left movement of the shutter plate 240 is possible, and thus the handle 180 may be inserted into the insertion groove 216 of the draw-in and draw-out screw 217 to move the circuit breaker main body 100 forward and backward.

However, referring to FIG. 13(*c*), if the first key assembly 260 or the second key assembly 265 of the key interlock assembly 250 is placed in the locked state in a state in which the off button 120 is pressed, the interlock plate 270 moves to the right and is positioned in the locked position. Thus, since the lowering of the interlock lever 235 is prevented, the off button 120 remains pressed.

Therefore, since the on button 128 cannot be pressed, the input operation is restricted, and since the shutter plate 240 is caught in the restraining part 276 and cannot be moved, the movement of the circuit breaker main body 100 is restricted. As such, the air circuit breaker according to the first embodiment of the present disclosure can simultaneously implement a function of restraining the input operation of the circuit breaker main body and a function of restraining the positional movement of the circuit breaker main body inside the cradle.

Figure 14:
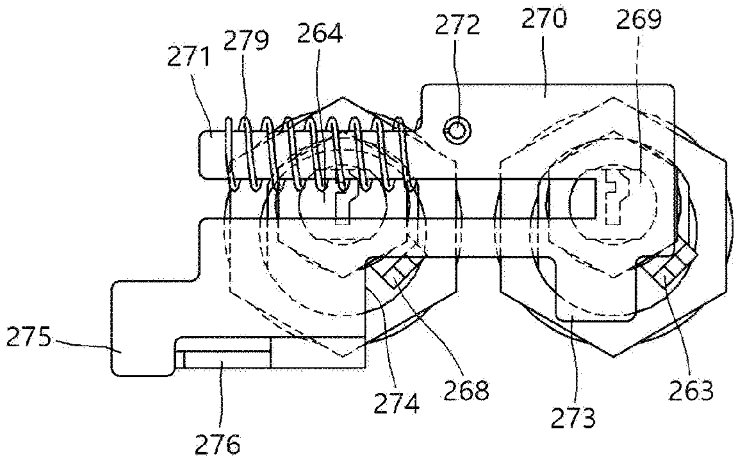
Figure 15:
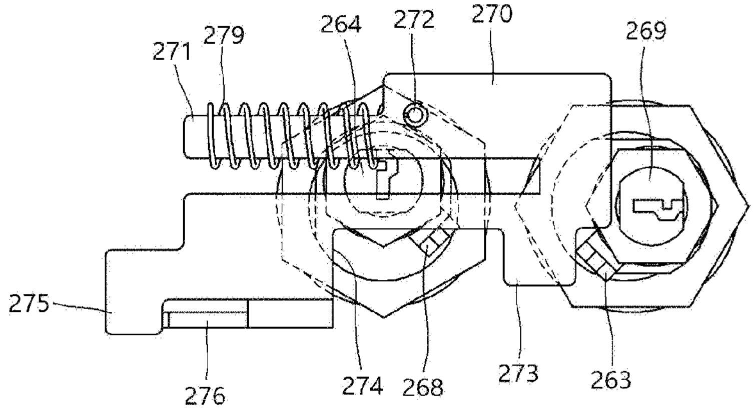
Figure 16:
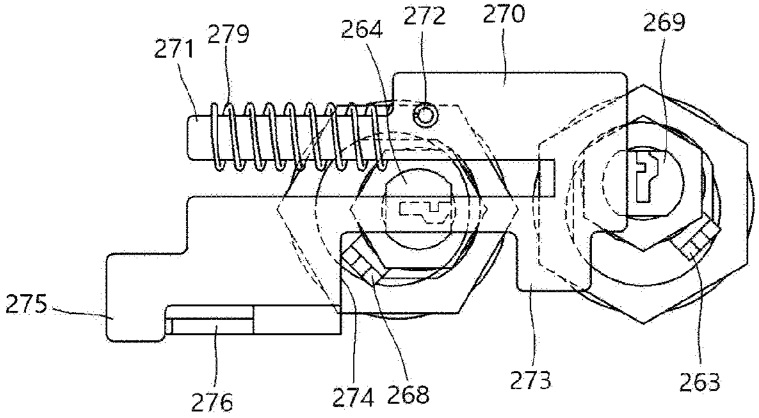
Figure 17:
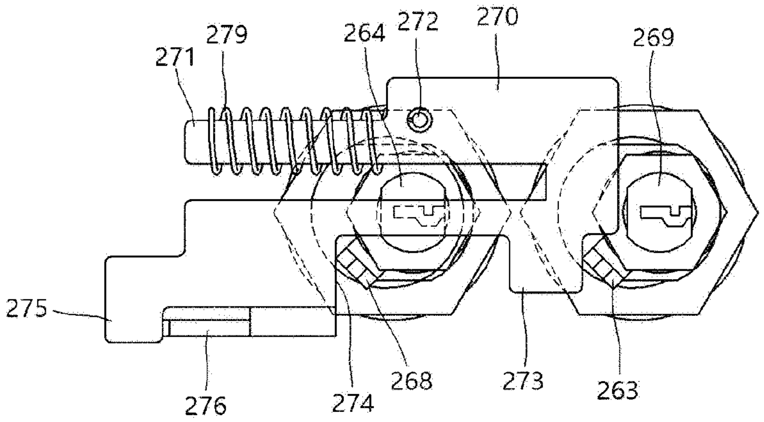

FIGS. 14 to 17 are views showing a state in which the key assembly and the interlock plate according to the first embodiment of the present disclosure are viewed from a transfer module side toward a cover plate side, in which FIG. 14 is a view showing a state in which both first and second key assemblies are released, FIG. 15 is a view showing a case where the first key assembly is in a locked state and the second key assembly is in an unlocked state, FIG. 16 is a view showing a case where the first key assembly is in an unlocked state and the second key assembly is in a locked state, and FIG. 17 is a view showing a case where both the first and second key assemblies are in a locked state.

FIG. 14 shows an unlocked state of the key interlock assembly 250, wherein both the first key assembly 260 and the second key assembly 265 are in the unlocked state. The pressing parts 263 and 268 of each key assembly are separated (unlocked) from the contact parts 273 and 274 of the interlock plate 270.

FIG. 15 shows that the first key assembly 260 is in a locked state and the second key assembly 265 is in an unlocked state. When the first pressing part 263 of the first key assembly 260 pushes the first contact part 273 by turning the first key 261, the interlock plate 270 moves in the direction of the interlock lever 235 (the first key assembly is switched to a locked state).

FIG. 16 shows that the first key assembly 260 is in an unlocked state and the second key assembly 265 is in a locked state. When the second pressing part 268 of the second key assembly 265 pushes the second contact part 274 by turning the second key 266, the interlock plate 270 moves in the direction of the interlock lever 235 (the second key assembly is switched to a locked state).

FIG. 17 shows that both the first and second key assemblies 260 and 265 are in a locked state. This is a state in which the first pressing part 263 pushed the first contact part 273 and the second pressing part 268 pushed the second contact part 274 (both the first key assembly 260 and the second key assembly 265 are switched to the locked state).

Except for the case where the key interlock assembly 250 is unlocked as shown in FIG. 14, when any one or more key assemblies of the key interlock assembly 250 are placed in the locked state as shown in FIGS. 15 to 17, the actions on the cradle 200 and the circuit breaker main body 100 are the same. That is, when any one or more key assemblies are in the locked state, since the downward movement of the interlock lever 235 is restricted, so that the off button 120 is placed in the pressed state, the input action is prevented, and since the movement of the shutter plate 240 is restricted by the restraining part 276, the movement of the circuit breaker main body 100 is prevented.

As such, the air circuit breaker according to the first embodiment of the present disclosure can maintain the pushed state of the off button of the circuit breaker main body, and thus maintain the input restriction function of the circuit breaker main body, while maintaining the positional movement restriction function of the circuit breaker main body.

Meanwhile, the first key assembly 260 and the second key assembly 265 may be used in combination with each other in a suitable use and method. The first key assembly 260 and the second key assembly 265 can be used independently or in parallel.

When only one circuit breaker is used, either one of the first key assembly 260 and the second key assembly 265 may be used to operate in a key interlock locked state or a key interlock unlocked state. That is, in a circuit breaker used alone, any one key assembly may be used to use the input prevention function and the movement prevention function of the circuit breaker main body.

When the first key assembly 260 and the second key assembly 265 are used in parallel, for example, one key assembly is used together with an upper or lower circuit breaker, and the other key assembly is used together with the same circuit breaker. For example, the first key assembly 260 interlocks with an upper (lower) circuit breaker to apply a key interlock function (only one of the two circuit breakers is exclusively input and operated), and the second key assembly 265 interlocks with the emergency power source to apply a key interlock function (only one of the two circuit breakers connected to the main power source and the emergency power source is exclusively input and operated). As such, the user may use the key interlock assembly in appropriate combination to suit the use.

According to the air circuit breaker according to the first embodiment of the present disclosure, the function of restricting the input operation of the circuit breaker main body by the key interlock assembly, which is one interlock device, and the function of restricting the positional movement of the circuit breaker main body to each position in the cradle are simultaneously implemented.

When the key is turned to the locked state, the pushed state of the off button is maintained, so the input restriction function of the circuit breaker main body and the positional movement restriction function of the circuit breaker main body are continuously maintained. Accordingly, in the restrained state of the present circuit breaker, the key can be removed to unlock the restraint of another circuit breaker, and the input operation may be performed. In addition, the key assemblies for operating the key interlock assembly may be provided in two sets so that they can be used in parallel with the other two or more circuit breakers.

Hereinafter, the air circuit breaker according to the second embodiment of the present disclosure will be described. The air circuit breaker according to the second embodiment of the present disclosure may have the same configuration as in the first embodiment except for the front cover plate, the key interlock assembly, and the interlock plate, and a detailed description thereof will be omitted, and description will focus on the front cover plate, the key interlock assembly, and the interlock plate according to the second embodiment of the present disclosure.

Figure 18:
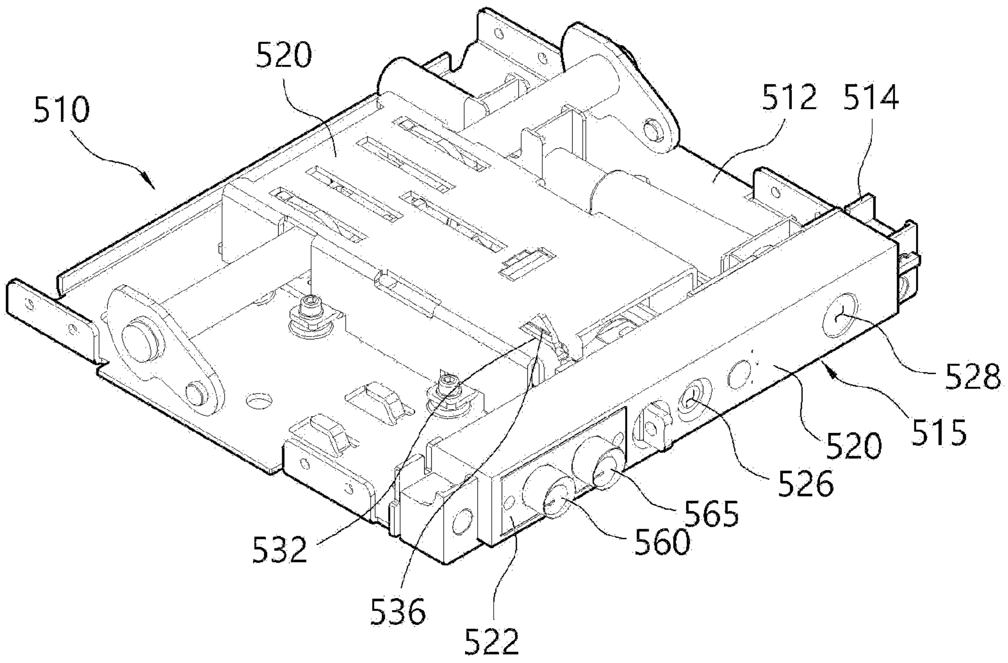
FIG. 18 is a perspective view of a transfer device unit on the lower side of a cradle according to a second embodiment of the present disclosure.
Figure 19:
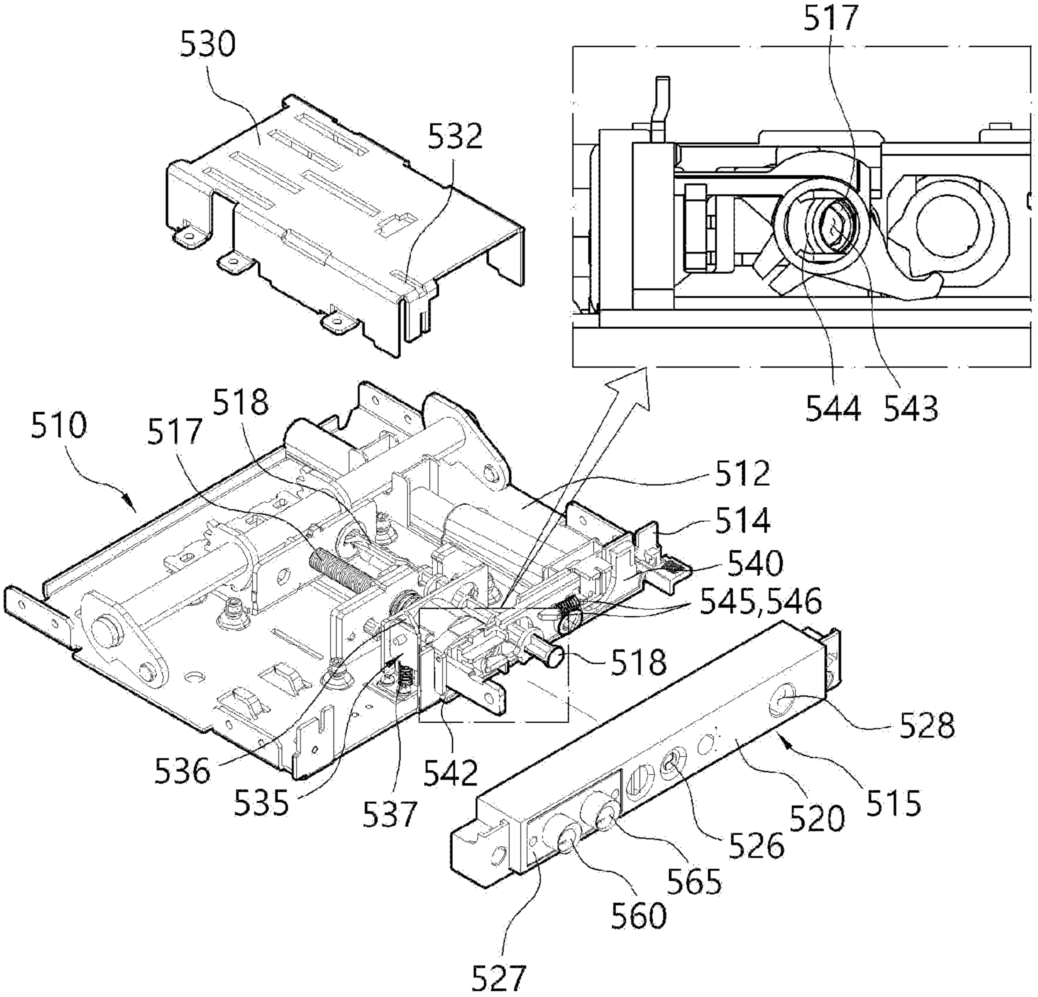
FIGS. 19 and 20 are exploded perspective views of the transfer device unit according to the second embodiment of the present disclosure viewed from different angles.
Figure 20:
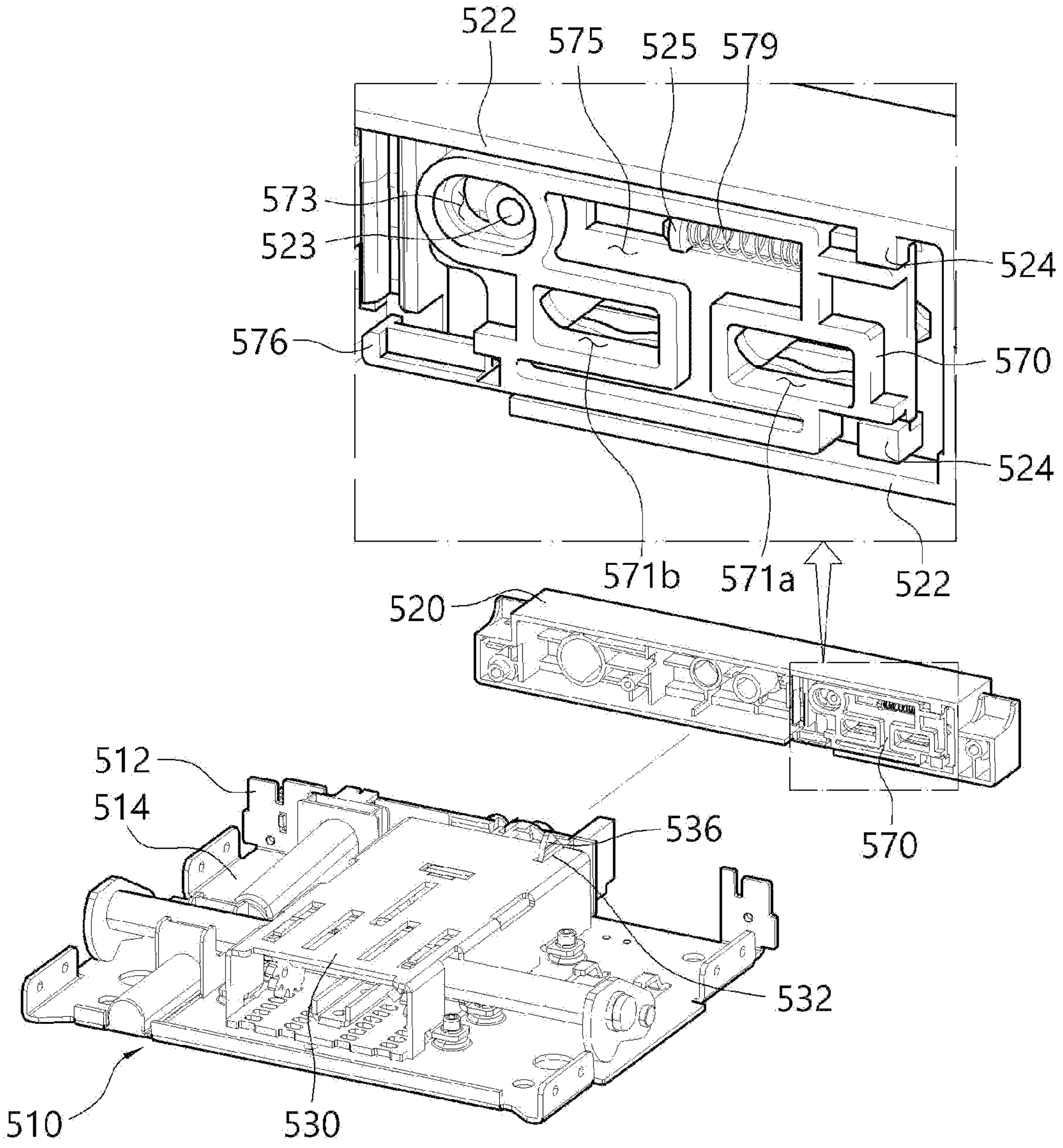
Figure 21:
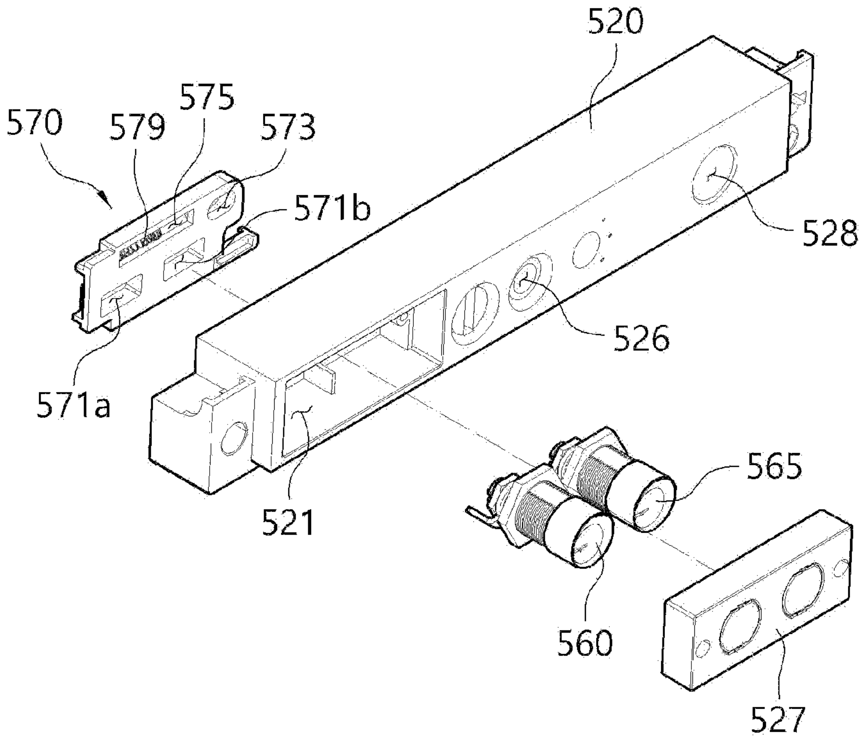
FIG. 21 is an exploded perspective view of an interlock plate, a front cover plate, a key assembly, and a cover member according to the second embodiment of the present disclosure.
Figure 22:
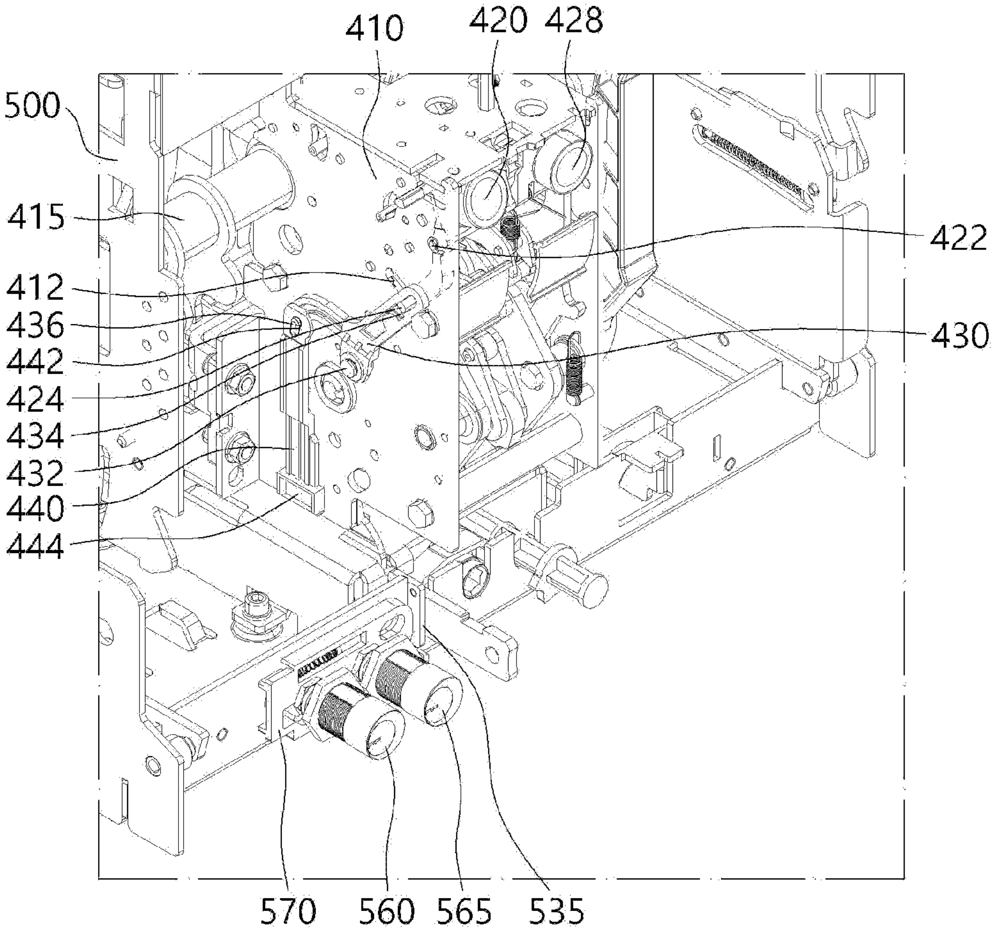
FIG. 22 is a partial perspective view of a state in which the circuit breaker main body is drawn-in into the cradle, according to the second embodiment of the present disclosure.

FIG. 18 is a perspective view of a transfer device unit on the lower side of a cradle according to a second embodiment of the present disclosure. FIGS. 19 and 20 are exploded perspective views of the transfer device unit according to the second embodiment of the present disclosure viewed from different angles. FIG. 21 is an exploded perspective view of an interlock plate, a front cover plate, a key assembly, and a cover member according to the second embodiment of the present disclosure. FIG. 22 is a partial perspective view of a state in which the circuit breaker main body is drawn-in into the cradle, according to the second embodiment of the present disclosure.

Referring to FIGS. 18 to 20, the transfer device unit 510 may include a base plate 512, a transfer unit cover plate 530, and draw-in and draw-out devices 517 and 518.

The base plate 512 may provide a frame on which other components of the transfer device unit 510 may be seated and supported. A front surface portion 514 bent upward to cover the front of the draw-in and draw-out devices 517 and 518 is formed on the front portion of the base plate 512.

The draw-in and draw-out devices 517 and 518 for drawing in and drawing out the circuit breaker main body are installed on the upper surface of the base plate 512. The draw-in and draw-out devices 517 and 518 may include a draw-in and draw-out screw 517 and a position indicating screw 518. A hole is formed in the front surface portion 514 to frontally expose the front end of the draw-in and draw-out screw 517 and the front end of the position indicating screw 518.

The interlock lever 535 is installed to be movable up and down on the front portion of the base plate 512. In this case, the interlock lever 535 has a triangular head part 536, the length of which decreases as it goes upper side. A lever return spring 537 having one side fixed to the base plate 512 is installed below the interlock lever 535. The interlock lever 535 is subjected to an upward force by the lever return spring 537. Accordingly, the interlock lever 535 is in an elevated first position in a normal state in which no external force is applied.

Referring to FIGS. 18 and 22, the head part 536 of the interlock lever 535 passes through the lever motion hole 532 formed on the upper surface of the transfer unit cover plate 530 and protrudes upward of the transfer unit cover plate 530. The head part 536 protruding upward of the transfer unit cover plate 530 is pressed by the lower end of the elevation member 440.

When the off button 420 is pressed, the off button 420 moves to the rear side and rotates, and interlocked with this, the switching member 430 rotates clockwise (when viewed from the left side of FIG. 22) around a switching member rotation shaft 432. In response to this, the elevation member 440 may move upward, and the interlock lever 535 may move upward to the first position.

When the external force pressing the off button 420 is removed, the off button 420 returns to its original position by the restoring force of the torsion spring, and interlocked with this, the switching member 430 rotates counterclockwise (when viewed from the left side of FIG. 22). In response to this, the elevation member 440 moves downward, and the interlock lever 535 is lowered and then fixed at the second position.

The off button, the switching member, the elevation member and the interlock lever according to the second embodiment of the present disclosure may be configured in the same manner as the off button, the switching member, the elevation member and the interlock lever according to the first embodiment of the present disclosure, which has been described in detail together with FIG. 9, and thus a detailed description thereof will be omitted.

Referring to FIGS. 19 and 20, a shutter plate 540 is installed on one front side of the front surface portion 514. The shutter plate 540 may include a movement limiting part 542, a shutter portion handle insertion hole 543, an insertion prevention part 544, and a shutter return spring 548. The shutter plate 540 and its lower components 542, 543, 544, and 548 may be configured in the same manner as in the first embodiment of the present disclosure.

A front cover plate 520 covering the front surface of the transfer device unit 510 is located in the front of the transfer device unit 510 and the shutter plate 540. In this case, the interlock plate 570 and key assemblies 560 and 565 to be described later are installed on the front cover plate 520.

Referring to FIGS. 19 to 21, a key assembly accommodating groove 521 is formed in the front surface of the front cover plate 520. An interlock plate 570 is installed to be movable in a horizontal direction at a portion corresponding to the key assembly accommodating groove 521 on the rear surface of the front cover plate 520.

The key assembly accommodating groove 521 is opened forward. A key assembly hole is formed in the bottom surface of the key assembly accommodating groove 521. The key assemblies 560 and 565 may pass through the key assembly hole and be coupled to the interlock plate 570 located at the rear of the front cover plate 520 to move the interlock plate 570 in the horizontal direction.

Accordingly, the air circuit breaker according to the second embodiment of the present disclosure can separate the key assemblies 560 and 565 in a state in which the front cover plate 520 is not disassembled from the transfer device unit 510, and thus can easily maintain, repair and replace the key assemblies 560 and 565, and immediately reflect a customer's demand.

In addition, the key assemblies 560 and 565 may be replaced with other operating means for moving the interlock plate 570. For example, the key assemblies 560 and 565 may be replaced with electronic devices including an electronic interface that may be manipulated by a user and a motor that moves the interlock plate 570.

An accommodating groove cover member 527 capable of covering the key assembly accommodating groove 521 is installed on the front cover plate 520. Accordingly, the key assemblies 560 and 565 accommodated in the key assembly accommodating groove 521 may be protected from the outside. In addition, arbitrary access to the key assemblies 560 and 565 by third parties may be blocked. Screw grooves for coupling the accommodating groove cover member 527 to the front cover plate 520 are provided at both sides of the accommodating groove cover member 527 and the key assembly accommodating groove 521, respectively.

Meanwhile, a handle insertion hole 526, a handle storage hole 528, and the like are formed in the front cover plate 520. In this case, the handle insertion hole 526 is formed at a position corresponding to the tool groove of the draw-in and draw-out screw 517. Accordingly, the handle may pass through the handle insertion hole 526 and be coupled to the tool groove. In addition, the handle insertion hole 526 may be opened and closed by the horizontal movement of the shutter plate 540.

Figure 23:
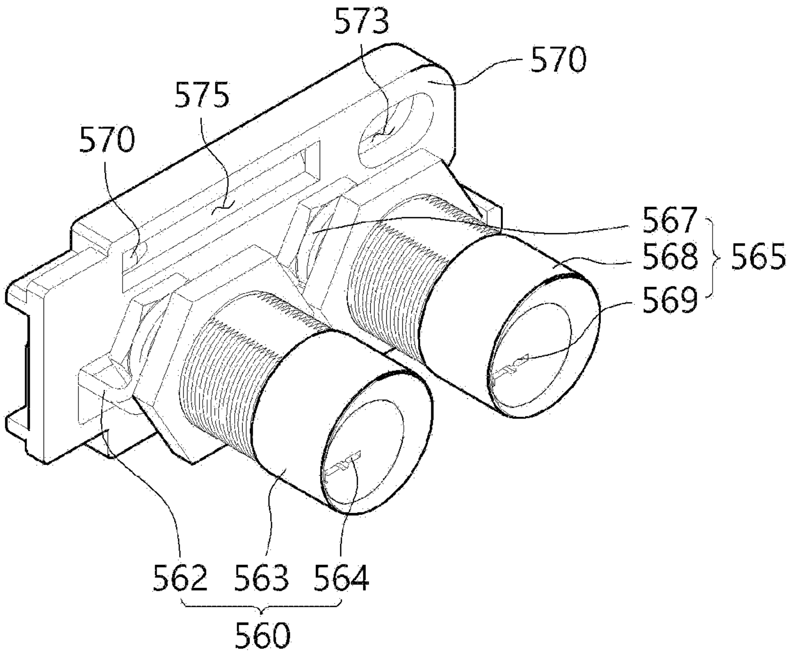
FIGS. 23 and 24 are perspective views of a key assembly and an interlock plate according to the second embodiment of the present disclosure viewed from different angles.
Figure 24:
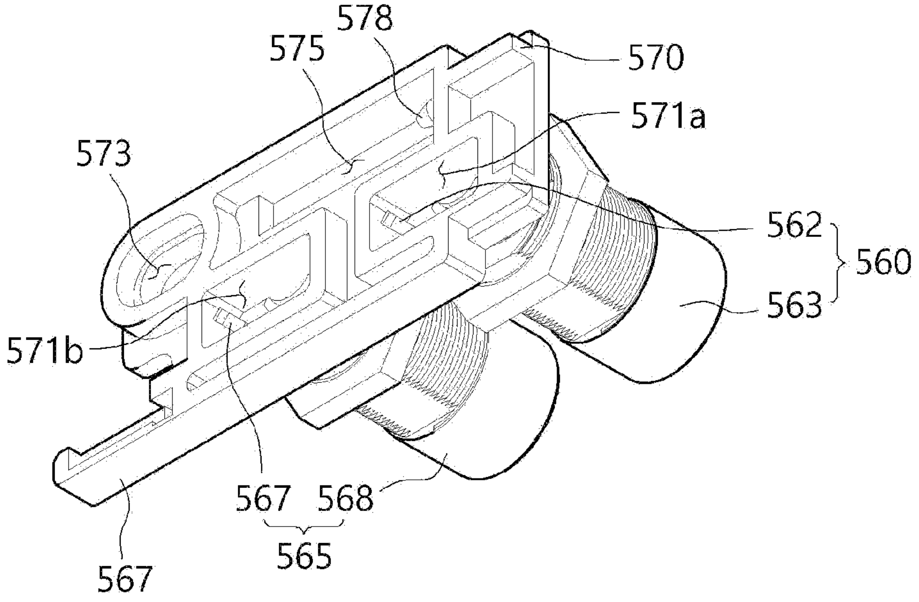
Figure 25:
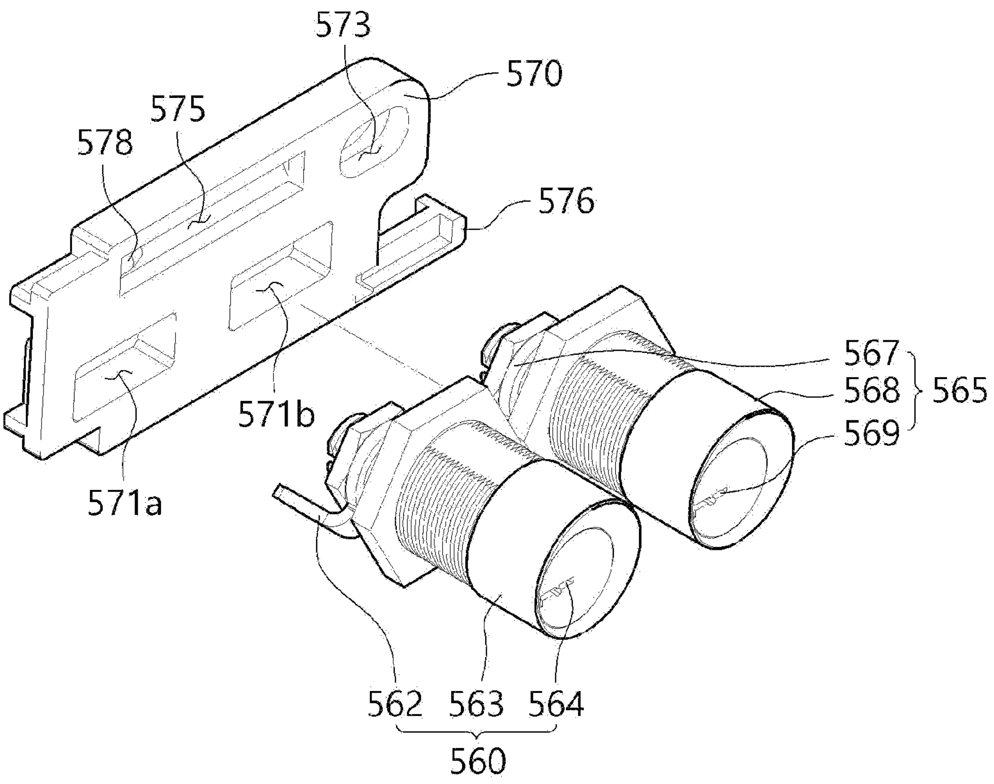
FIG. 25 is an exploded perspective view of a key assembly and an interlock plate according to the second embodiment of the present disclosure.

FIGS. 23 and 24 are perspective views of a key assembly and an interlock plate according to the second embodiment of the present disclosure viewed from different angles. FIG. 25 is an exploded perspective view of a key assembly and an interlock plate according to the second embodiment of the present disclosure.

Referring to FIGS. 23 to 25, the interlock plate 570 and the first and second key assemblies 560 and 565 may be provided to simultaneously perform a function of preventing the input of the circuit breaker main body and a function of limiting the draw-in and draw-out of the circuit breaker main body.

The first key assembly 560 includes a first rotating cylinder 563, a first key groove 564, and a first key lever 562. The first rotating cylinder 563 may be rotated in one direction by using a key inserted into the first key groove 564.

The first key lever 562 rotating together with the first rotating cylinder 563 is coupled to the rear of the first rotating cylinder 563. The first key lever 562 is bent toward the interlock plate 570. The first key lever 562 may be inserted into a first key lever hole 571*a* formed in the interlock plate 570.

The first key lever 562 rotates and presses a portion of the inner circumferential surface of the first key lever hole 571*a*. For example, when viewed from the front of FIG. 25, when the first rotating cylinder 563 is rotated counterclockwise, the first key lever 562 presses the inner surface of the right side of the first key lever hole 571*a* to move the interlock plate 570 to the right side.

Meanwhile, the second key assembly 565 has the same shape as the first key assembly 560. That is, the second key assembly 565 includes a second rotating cylinder 568, a second key groove 569, and a second key lever 567, and the second rotating cylinder 568, the second key groove 569, and the second key lever 567 are formed in the same shape as the first rotating cylinder 563, the first key groove 564, and the first key lever 562, respectively.

In this case, the first key assembly 560 and the second key assembly 565 are arranged side by side in the horizontal direction. In addition, a second key lever hole 571*b* into which the second key lever 567 can be inserted is provided in the interlock plate 570. In this case, the lever holes 571*a* and 571*b* are formed along the movement direction (i.e., horizontal direction) of the interlock plate 570.

Referring again to the enlarged view of FIG. 20 and FIG. 25, the interlock plate 570 is installed to be horizontally movable to the rear of the front cover plate 520. A return spring hole 575 into which a plate return spring 579 can be inserted is formed above the lever holes 571*a* and 571*b* in the interlock plate 570. A spring installation part 578 protruding in the movement direction (i.e., the horizontal direction) of the interlock plate 570 is provided on the inner circumferential surface of the return spring hole 575.

A plate return spring 579 is installed to the spring installation part 578. In this case, the plate return spring 579 may be a coil spring. A return spring support part 525 protrudes from the rear surface of the front cover plate 520 toward the interlock plate 570. The return spring support part 525 is inserted into the return spring hole 575 of the interlock plate 570 to support one side of the plate return spring 579.

Accordingly, in a normal state in which no external force is applied to the interlock plate 570, the interlock plate 570 is in a state of being moved to the right side (the direction away from the interlock lever 535) with reference to FIG. 20.

When the interlock plate 570 is moved to the left side (the direction approaching the interlock lever 535) with reference to FIG. 20 by an external force (e.g., force by a key lever of the key assembly), elastic force may be stored in the plate return spring 579. When the external force is removed from the interlock plate 570, the interlock plate 570 is moved to the right by the restoring force of the plate return spring 579.

Referring to the enlarged view of FIG. 20, on the rear surface of the front cover plate 520, first guide protrusions 522 are formed on the upper and lower sides of the interlock plate 570 along the movement direction of the interlock plate 570. The interlock plate 570 is inserted into the inner side of the first guide protrusion 522 and moves by being guided by the first guide protrusion 522.

In addition, a second guide protrusion 523 protruding toward the interlock plate 570 is formed on the front cover plate 520. A guide hole 573 is formed in a movement direction (i.e., horizontal direction) of the interlock plate 570 on one side of the return spring hole 575 of the interlock plate 570. The second guide protrusion 523 may be inserted into the guide hole 573 to perform a sliding motion inside the guide hole 573 as the interlock plate 570 moves.

Accordingly, the interlock plate 570 according to an embodiment of the present disclosure may be stably move by being guided by the first guide protrusion 522 and the second guide protrusion 523.

Meanwhile, a stopper 524 protruding toward the interlock plate 570 is provided on the rear side surface of the front cover plate 520. The stopper 524 is disposed on a path through which the interlock plate 570 moves. For example, with reference to the enlarged view of FIG. 20, a plurality of stoppers 524 may be disposed at the upper right end and the lower right end of the interlock plate 570, respectively. The stopper 524 performs a function of preventing the interlock plate 570 from departing from a set motion path.

Figure 26:
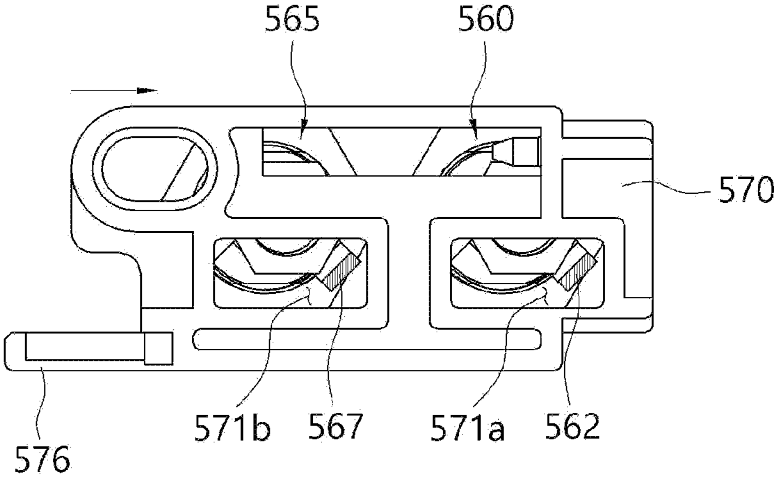
Figure 27:
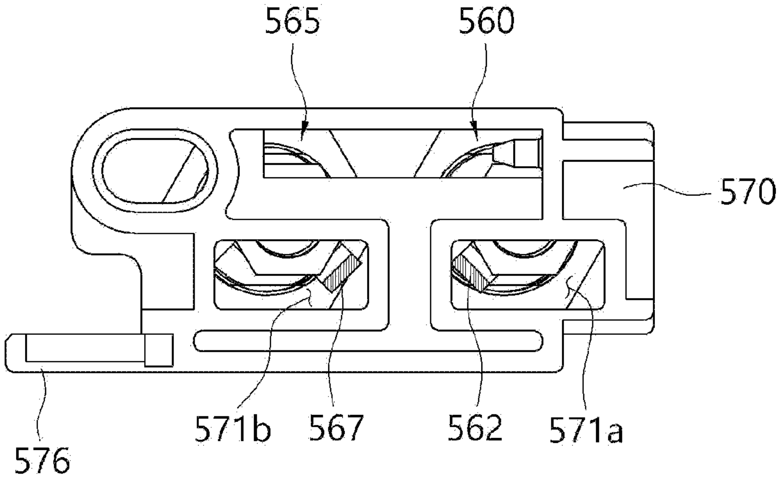
Figure 28:
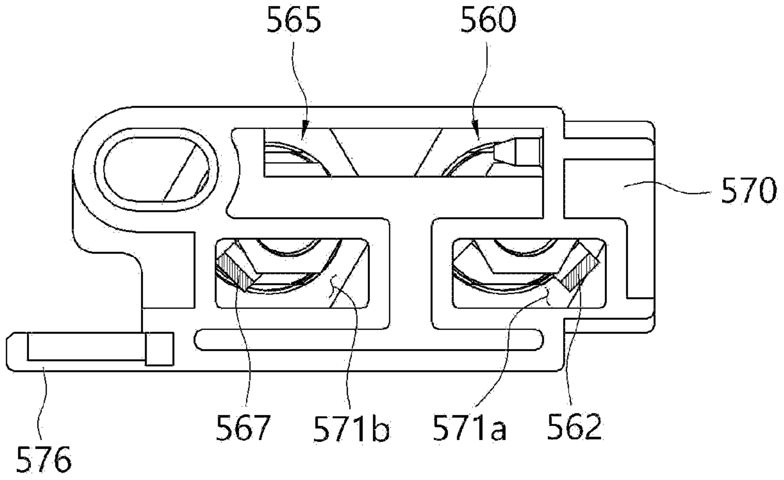
Figure 29:
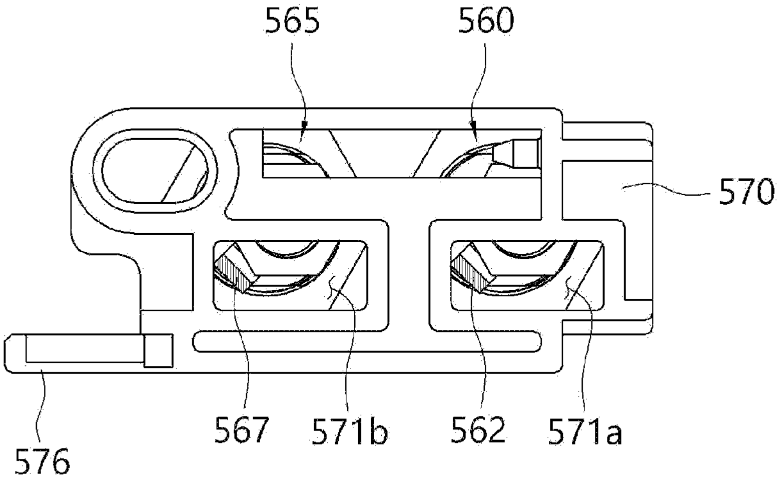

FIGS. 26 to 29 are views showing a state in which the key assembly and the interlock plate according to the second embodiment of the present disclosure are viewed from a transfer module side toward a cover plate side, in which FIG. 26 is a view showing a state in which both first and second key assemblies are released, FIG. 27 is a view showing a case where the first key assembly is in a locked state and the second key assembly is in an unlocked state, FIG. 28 is a view showing a case where the first key assembly is in an unlocked state and the second key assembly is in a locked state, and FIG. 29 is a view showing a case where both the first and second key assemblies are in a locked state.

Referring to FIG. 26, both the first key assembly 560 and the second key assembly 565 are in an unlocked state. Since the first key lever 562 and the second key lever 567 are all moved to the right with reference to FIG. 26, the interlock plate 570 may be moved to the right by the restoring force of the plate return spring without being fixed in position by the key levers 562 and 567. That is, the interlock plate 570 may not restrict the motion of the interlock lever and the motion of the shutter plate.

Referring to FIG. 27, the first key assembly 560 is in a locked state and the second key assembly 565 is in an unlocked state. Since the second key lever 567 is moved to the right side with reference to FIG. 27 but the first key lever 562 is moved to the left side, the movement of the interlock plate 570 to the right is restricted by the first key lever 562. That is, the interlock plate 570 may be fixed in a locked position to limit the motion of the interlock lever and the motion of the shutter plate.

Referring to FIG. 28, the first key assembly 560 is in an unlocked state and the second key assembly 565 is in a locked state. Since the first key lever 562 is moved to the right side with reference to FIG. 28 but the second key lever 567 is moved to the left side, the movement of the interlock plate 570 to the right is restricted by the second key lever 567. That is, the interlock plate 570 may be fixed in a restrained position to limit the motion of the interlock lever and the motion of the interlock plate.

Referring to FIG. 29, both the first key assembly 560 and the second key assembly 565 are in a locked state. Since the first key lever 562 and the second key lever 567 are all moved to the left with reference to FIG. 29, the interlock plate 570 may be fixed in a restrained position by the key levers 562 and 567 and cannot be moved to the right. That is, the interlock plate 570 may restrict the motion of the interlock lever and the motion of the shutter plate.

When any one or more key assemblies 560 and 565 are in the locked state as shown in FIGS. 27 to 29, except for the case where the key assemblies 560 and 565 are all unlocked as shown in FIG. 26, the downward movement of the interlock lever is restricted, and the off button maintains a pushed state, so that the input action is prevented, and the movement of the shutter plate is limited, so the draw-in and draw-out of the circuit breaker main body is prevented.

The first key assembly 560 and the second key assembly 565 may be used in combination with each other in a suitable use and method. That is, the first key assembly 560 and the second key assembly 565 may be used independently as well as in parallel.

As described above, the air circuit breaker according to an embodiment of the present disclosure may simultaneously implement a function of restraining the input operation and the draw-in and draw-out of the circuit breaker main body by positioning the interlock plate at the locked position to limit the movement of the interlock lever and the shutter plate. Further, the air circuit breaker according to an embodiment of the present disclosure may maintain a state in which the input operation and the draw-in and draw-out of the circuit breaker main body are restricted, by fixing the interlock plate at the locked position using an operating means.

In addition, the air circuit breaker according to an embodiment of the present disclosure may place the interlock plate on an inner surface of the cover plate covering the outer surface of the transfer device unit, place an operating means for moving the interlock plate on the outer surface, and have an accommodating groove formed in the cover plate to accommodate the operating means, so that the operating means can be easily separated without detaching the cover plate, so that the operating means can be easily maintained, repaired, and replaced, and the demands of the customer can be immediately reflected.

Although exemplary embodiments of the present disclosure have been described above, the idea of the present disclosure is not limited to the embodiments set forth herein. Those of ordinary skill in the art who understand the idea of the present disclosure may easily propose other embodiments through supplement, change, removal, addition, etc. of elements within the scope of the same idea, but the embodiments will be also within the idea scope of the present disclosure.

What is claimed is:

1. An air circuit breaker, comprising:

a cradle and a circuit breaker main body drawn in and drawn out to/from the cradle;

an interlock lever connected to an off button of the circuit breaker main body to move vertically; and a transfer device unit provided on a lower side of the cradle, wherein the transfer device unit has a key interlock assembly, which is provided to be horizontally movable so that, in a state of having moved toward a first side thereof, the movement of the interlock lever is restricted and, in a state of having moved toward a second side thereof, the movement of the interlock lever is permitted.

2. The air circuit breaker of claim 1, wherein a shutter plate installed to be horizontally movable and restricted or allowed to move according to a position of the interlock lever is provided in the transfer device unit, and wherein the key interlock assembly restricts movement of the shutter plate in a state in which the key interlock assembly is moved in a first direction and allows movement of the shutter plate in a state in which the key interlock assembly is moved in a second direction.

3. The air circuit breaker of claim 1, wherein the key interlock assembly comprises:

a housing plate coupled to the transfer device unit;

an interlock plate installed to be horizontally movable on the housing plate; and a key assembly that moves the interlock plate.

4. The air circuit breaker of claim 3, wherein a key hole in which the key assembly is installed is formed on a front surface of the housing plate.

5. The air circuit breaker of claim 3, wherein a through hole is formed on two side surfaces of the housing plate, respectively, to allow the interlock plate to slide.

6. The air circuit breaker of claim 3, wherein a spring insertion part into which a plate return spring can be installed is provided on the interlock plate.

7. The air circuit breaker of claim 3, further comprising a second key assembly provided in a pair of key assemblies with the key assembly, and at least one key assembly of the pair of key assemblies is positioned at a specific position to fix the interlock plate in a locked position.

8. The air circuit breaker of claim 3, wherein a contact part subjected to force of the key assembly is formed to protrude from the interlock plate.

9. The air circuit breaker of claim 8, wherein a restraining part for limiting or allowing movement of the interlock lever is bent and formed on the interlock plate.

10. The air circuit breaker of claim 9, wherein the restraining part is disposed at a height between intervals where the interlock lever moves upward and downward.

11. The air circuit breaker of claim 8, wherein the key assembly comprises a rotating cylinder rotated by a key, and a key lever rotating with the rotating cylinder is provided at a rear portion of the key assembly.

12. The air circuit breaker of claim 11, wherein a pressing part for applying force to the contact part is bent and formed on the key lever.

13. An air circuit breaker, comprising:

a cradle with one side surface open;

a circuit breaker main body configured to be drawn in and drawn out to/from the one side surface of the cradle;

an interlock lever connected to a button of the circuit breaker main body and configured to be located at a first position in a state in which the button is pressed, and located at a second position in a state in which the button is not pressed;

a transfer device unit provided in the cradle to draw in and draw out the circuit breaker main body; and an interlock plate movably installed in a front of the transfer device unit to fix the interlock lever to the first position when the interlock plate is in a locked position, and to allow the interlock lever to be moved from the first position to the second position when the interlock plate is in an unlocked position.

14. The air circuit breaker of claim 13, further comprising:

a cover plate covering an outer surface of the transfer device unit and having a hole formed thereon; and a shutter plate positioned between the transfer device unit and the cover plate and opening and closing the cover plate hole, wherein the interlock plate positions and fixes the shutter plate to a position where the cover plate hole is closed in a state where the interlock plate is moved to the locked position, and allows movement of the shutter plate to open and close the cover plate hole of the shutter plate in a state where the interlock plate is moved to the unlocked position.

15. The air circuit breaker of claim 14, wherein the cover plate has a first guide protrusion respectively formed on both sides of the interlock plate along a motion direction of the interlock plate.

16. The air circuit breaker of claim 14, wherein a second guide protrusion protruding toward the interlock plate is formed on the cover plate, and wherein a guide groove extending along a motion direction of the interlock plate and into which the second guide protrusion is inserted is formed on the interlock plate.

17. The air circuit breaker of claim 14, comprising an operating means for moving the interlock plate.

18. The air circuit breaker of claim 17, wherein an accommodating groove for accommodating the operating means is formed on an outer surface of the cover plate, and the interlock plate is disposed on an inner surface of the cover plate.

19. The air circuit breaker of claim 18, wherein the operating means is a key assembly.

20. The air circuit breaker of claim 19, wherein a key assembly hole through which the key assembly can pass is formed on a bottom surface of the accommodating groove.

* * * * *